United States Patent
Uehara

(10) Patent No.: US 6,336,867 B1
(45) Date of Patent: Jan. 8, 2002

(54) DAMPER MECHANISM AND DAMPER DISK ASSEMBLY

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/590,073

(22) Filed: Jun. 9, 2000

(30) Foreign Application Priority Data

Jun. 14, 1999 (JP) .......................................... 11-166611

(51) Int. Cl.$^7$ ................................................. F16D 3/66
(52) U.S. Cl. ......................................... 464/68; 192/213
(58) Field of Search .................. 464/64, 68; 192/70.17, 192/213

(56) References Cited

U.S. PATENT DOCUMENTS

| | | | | |
|---|---|---|---|---|
| 4,347,717 A | * | 9/1982 | Lamarche ..................... | 464/64 |
| 4,422,535 A | * | 12/1983 | Ling ......................... | 464/63 X |
| 4,946,420 A | * | 8/1990 | Jackel ....................... | 464/68 X |
| 5,097,721 A | * | 3/1992 | Umeyama et al. ......... | 464/68 X |
| 5,505,288 A | * | 4/1996 | Tomiyama et al. ....... | 464/68 X |
| 5,609,526 A | * | 3/1997 | Kitayama et al. ............. | 464/68 |
| 5,788,042 A | * | 8/1998 | Lohaus ................ | 192/70.17 X |
| 6,029,793 A | * | 2/2000 | Tanaka et al. .............. | 192/213 |

FOREIGN PATENT DOCUMENTS

| JP | 5240301 | 9/1993 |
|---|---|---|
| JP | 5240302 | 9/1993 |
| JP | 5240303 | 9/1993 |
| JP | 5240304 | 9/1993 |
| JP | 5240305 | 9/1993 |
| JP | 5296290 | 11/1993 |
| JP | 5332400 | 12/1993 |
| JP | 633949 | 2/1994 |

* cited by examiner

Primary Examiner—Lynne H. Browne
Assistant Examiner—Greg Binda
(74) Attorney, Agent, or Firm—Shinjyu Global IP Counselors, LLP

(57) ABSTRACT

A damper mechanism is provided for achieving a low rigidity in a small torsion angle region as well as a high rigidity in a large torsion angle region, and particularly the damper mechanism employing a stop mechanism having a reduced circumferential space. The damper mechanism 4 includes an output rotary hub 110, an input rotary member 2, a hub flange 12, a first spring 9, a second spring 10, a second stop 17 and a compressing portion 18. First and second springs 9 and 10 connected in series with the hub flange 12 arranged between them are disposed circumferentially between the output rotary hub 110 and the input rotary member 2. The second spring 10 in the initial state is kept and compressed in the rotating direction between the hub flange 12 and the input rotary member 2. When the torsion angle reaches the first torsion angle, the second stop 17 stops relative rotation between the output rotary hub 110 and the hub flange 12. The compressing portion 18 starts the compression of the first spring 9 when the torsion angle reaches the second torsion angle.

30 Claims, 28 Drawing Sheets

DAMPER MECHANISM AND DAMPER DISK ASSEMBLY

BACKGROUND OF THE INVENTION

1. Field of the Invention

This invention generally relates to a damper mechanism. More specifically, the present invention relates to a damper mechanism and a damper disk assembly for absorbing or damping torsional vibrations in a power transmission system.

2. Background Information

Clutch disk assemblies used in vehicles have a clutch function for engaging and disengaging the assembly with a flywheel and to receive rotation from the flywheel. Clutch disk assemblies also have a damper function for absorbing and damping torque variations transmitted from the flywheel. These torque variations can also create vibrations.

Generally, vibrations of a vehicle include idling noises (rattle), driving noises (acceleration/deceleration rattle and muffled noises) and tip-in/tip-out (low frequency vibrations). The clutch disk assembly has the above damper function for removing these noises and vibrations.

The idling noises are rattling noises that emanate from a transmission when the transmission is in a neutral position, e.g., while waiting at traffic signals with a disengaged clutch pedal. These noises occur because engine torque is low in an engine idling range and engine combustion causes large torque variations.

The tip-in/tip-outs (low frequency vibrations) are large longitudinal vibrations of a vehicle which occur when a driver rapidly depresses or releases an accelerator. More specifically, excessive vibrations occur when a torque is supplied stepwise to the drive and transmission system. As a result, a torque transmitted to wheels is reversely transmitted from the wheels to the drive system so that an excessive return torque occurs in the wheels. Thereby, the vehicle body transitionally vibrates back-and-forth to a large extent.

Noises during idling are related to a torque region around zero in torsion characteristics of the clutch disk assembly. A lower torsional rigidity can effectively dampen the vibrations. Accordingly, a clutch disk assembly has been provided in which a low rigidity spring is used for achieving nonlinear torsion characteristics having two stages exhibiting low and high rigidities. This clutch disk assembly is configured to exhibit a low torsional rigidity and a low hysteresis torque in the first stages. Therefore, this clutch disk assembly can effectively prevent noises during idling.

As described above, it is necessary to maintain a low rigidity in the first stage and to maintain relatively high rigidities in the second and third stages. For achieving sufficient stop torque, a region of the largest rigidity is required in a region of the largest torsion angle.

A damper mechanism that achieves the aforementioned characteristics is already known. Such a damper mechanism has two kinds of springs that operate in series in the first stage, and two kinds of springs that operate in parallel to provide high rigidity when the torsion angle is large. For example, in a structure disclosed in Japanese Laid-Open Patent Publication No. 5-240302, two kinds of springs operate in series when the torsion angle is small. Further, the two kinds of springs operate in parallel when the torsion angle exceeds a predetermined value.

This damper mechanism includes clutch and retaining plates, a hub, a rotary member, a first elastic member, an intermediate member, and a second elastic member. The clutch and retaining plates are on an input side. The hub is on an output side. The rotary member is arranged between the clutch and retaining plates and the hub. The first elastic member elastically couples the hub and an intermediate member in the rotating direction. The second elastic member elastically couples the intermediate member to the clutch and retaining plates in the rotating direction.

The clutch and retaining plates are provided with compressing portions which are spaced predetermined distances from the circumferentially opposite ends of the first elastic member. Each of stop pins coupling the clutch and retaining plates together is spaced a predetermined distance from an edge of a recess formed in a flange of the hub. Owing to the above structure, when the hub is twisted in one direction with respect to the clutch and retaining plates, the first and second elastic members initially operate in series so that a characteristically low rigidity is achieved. When the torsion angle increases to a predetermined value, the intermediate member engages with the hub, and the compressing portions of the clutch and retaining plates come into contact with the first elastic member. Thereafter, the first elastic member is compressed between the hub and the input plate, and the second elastic member is compressed between the hub and the input plate. Thus, the first and second elastic members operate in parallel between the hub and the input plate. When the torsion angle further increases, the stop pin comes into contact with the edge of the recess in the flange of the hub so that the relative rotation stops.

In the structure described above, the first and second elastic members start to be compressed at the torsion angle of 0 degrees. Therefore, the circumferential space between the stop pin and the edge of the recess in the flange of the hub can excessively increase. More specifically, the recess in the flange must be circumferentially large. In this case, windows that are formed in the flange of the hub for accommodating the elastic members must be small with regards to their circumferential angle or number.

In the structure described above, all the loads of the first and second elastic members act on the hub and the input plate when the first and second elastic members are compressed in parallel. Therefore, the flange of the hub must have an increased strength.

In view of the above, there exists a need for damper mechanism and damper disk assembly which overcomes the above mentioned problems in the prior art. This invention addresses this need in the prior art as well as other needs, which will become apparent to those skilled in the art from this disclosure.

SUMMARY OF THE INVENTION

An object of the present invention is to provide a damper mechanism, which can achieve characteristics of a low rigidity in a region of small torsional vibrations as well as characteristics of a high rigidity in a region of a large torsion angle, and which reduces a circumferential space in a relative rotation stop portion.

Another object of the present invention is to provide a damper mechanism, which can achieve a low rigidity in a region of small torsional vibrations as well as a high rigidity in a region of a large torsion angle, and which reduces a necessity for increasing a strength of the flange of the hub.

According to a first aspect of the present invention, a damper mechanism for absorbing and damping torsional vibrations in a rotating direction is provided. The damper mechanism includes a first rotary member, a second rotary member, an intermediate rotary member, a first elastic member, a second elastic member, a first relative rotation stop portion and a compressing portion. The second rotary member is rotatable with respect to the first rotary member. The intermediate rotary member is disposed between the first and second rotary members. The first elastic member is disposed between the first rotary member and the intermediate rotary member. The first elastic member is compressed when relative rotation occurs between the first rotary member and the intermediate rotary member. The second elastic member is disposed between the intermediate rotary member and the second rotary member. The second elastic member is compressed when relative rotation occurs between the intermediate rotary member and the second rotary member. The second elastic member is initially compressed in the rotating direction between the intermediate rotary member and the second rotary member to bear an initial load. The first relative rotation stop portion stops the relative rotation between the first rotary member and the intermediate rotary member when the torsion angle of the first rotary member with respect to the second rotary member reaches a first torsion angle. The compressing portion starts the compression of the first elastic member between the first and second rotary members when the torsion angle of the first rotary member with respect to the second rotary member reaches a second torsion angle larger than the first torsion angle. The second elastic member is configured to bear an initial load such that the compression does not occur between the intermediate rotary member and the second rotary member until the torsion angle exceeds the first torsion angle.

In the damper mechanism according to the first aspect of the present invention, only the first elastic member is compressed and the second elastic member is not compressed when the first rotary member is twisted relatively to the second rotary member in a small torsion angle region. Therefore, torsion characteristics are determined only by the first elastic member. When the torsion angle reaches the first torsion angle, the first relative rotation stop portion stops the relative rotation between the first rotary member and the intermediate rotary member. Therefore, the first elastic member compressed between the first and intermediate rotary members is kept in the compressed state. The second elastic member is compressed between the intermediate and second rotary members. Thereby, the torsion characteristics are determined only by the second elastic member. After the torsion angle reaches the second torsion angle, the compressing portion operates to compress the first elastic member between the first and second rotary members. Thus, the first elastic member is compressed between the first and second rotary members. Further, the second elastic member is compressed between the intermediate and second rotary members. In this manner, the first and second elastic members are compressed in parallel.

According to the characteristics described above, the first elastic member provides the first stage of the characteristics. The second elastic member provides the second stage of the characteristics. The first and second elastic members together provide the third stage of the characteristics by the parallel operation.

According to the damper mechanism of the first aspect of the present invention, the parallel compression and therefore the parallel operation of the first and second elastic members are performed in such a manner that the first elastic member is operated by the first rotary member. The second rotary member is operated by the intermediate rotary member engaged with the first rotary member so that a load torque acting on the intermediate rotary member is small. Consequently, the strength of the intermediate rotary member can be lower than that in the prior art.

According to another aspect of the present invention, the damper mechanism further includes a second relative rotation stop portion for stopping the relative rotation between the first and second rotary members when the torsion angle of the first rotary member with respect to the second rotary member reaches a third torsion angle larger than the second torsion angle. In this structure, the first and second elastic members do not act in series so that the circumferential size of the second relative rotation stop portion can be small.

According to yet another aspect of the present invention, the damper mechanism further has such a feature that the first relative rotation stop portion is formed by and between the first rotary member and the intermediate rotary member. The second relative rotation stop portion is formed by and between the intermediate rotary member and the second rotary member. In this structure, the second relative rotation stop portion formed by the intermediate rotary member and the second rotary member can be reduced in circumferential angular size.

According to yet another aspect of the present invention, the damper mechanism further has such a feature that the compressing portion is formed of a portion of the second rotary member. The compressing portion is disposed in a position spaced by a first space in the rotating direction from the first elastic member. A second space formed in the rotating direction between the intermediate rotary member and the second rotary member in the second relative rotation stop portion is angularly larger than the first space. When the torsion angle exceeds the second torsion angle by an extent corresponding to the first space, the compressing portion which is a portion of the second rotary member comes into contact with the second elastic member.

In accordance with still another aspect of the present invention, a damper disk assembly is provided for absorbing and damping torsional vibrations in a rotating direction. The damper disk assembly includes an output rotary hub, a pair of disk-like input members, an intermediate disk-like member, a first elastic member, a second elastic member, a first relative rotation stop portion and a compressing portion. The paired disk-like input members are disposed relatively rotatably around the output rotary hub, and are fixed together with an axial space therebetween. The intermediate disk-like member is disposed rotatably around the output rotary hub and axially between the paired disk-like input members, and is provided with first and second windows. The first elastic member is disposed within the first window. The first elastic member is arranged between the output rotary hub and the intermediate disk-like member for compression in accordance with the relative rotation between the output rotary hub and the intermediate disk-like member. The second elastic member is accommodated in the second window. The second elastic member is arranged between the intermediate disk-like member and the pair of disk-like input members for compression in accordance with the relative rotation between the intermediate rotary member and the pair of disk-like input members. The second elastic member is initially compressed in the rotating direction between the intermediate rotary member and the pair of disk-like input members to bear an initial load. The first relative rotation stop portion stops the relative rotation between the output rotary hub and the intermediate disk-like member when the torsion angle of the output rotary hub with respect to the input disk-like member pair reaches a first torsion angle. The compressing portion starts the compression of the first elastic member between the output rotary hub and the input disk-like member pair when the torsion angle of the output rotary hub with respect to the input disk-like member pair reaches a second torsion angle larger than the first torsion angle. The second elastic member bears an initial load for preventing further compression between the intermediate disk-like member and the input disk-like member pair in a range smaller than the first torsion angle.

According to this damper disk of the present invention, the first elastic member is compressed between the output rotary hub and the intermediate disk-like member in a range of a small torsion angles for which the output rotary hub is twisted in the rotating direction. The output rotary hub is twisted with respect to the pair of disk-like input members. Thereby, the torsion characteristics are provided only by the first elastic member. When the torsion angle increases to the first torsion angle, the first relative rotation stop portion stops the relative rotation between the output rotary hub and the intermediate disk-like member. Thereby, the first elastic member maintains a state in which it is compressed in the rotating direction between the output rotary hub and the intermediate disk-like member. Further, the second elastic member is compressed in the rotating direction between the intermediate disk-like member and the pair of disk-like input members. Thereby, the second elastic member provides the torsion characteristics. When the torsion angle reaches the second torsion angle, the compressing portion starts the compression of the first elastic member. Thereby, the first elastic member is compressed between the output rotary hub and the pair of disk-like input members. Further, the second elastic member is compressed in the rotating direction between the intermediate disk-like member and the input disk-like member pair. Thus, the first and second elastic members operate in parallel between the output rotary hub and the pair of disk-like input members.

As a result, the torsion characteristics of this damper mechanism include the first stage, the second stage, and the third stage. In the first stage only the first elastic member operates. In the second stage only the second elastic member operates. In the third stage only the first and second elastic members operate in parallel.

In this damper disk assembly of the present invention, the first and second elastic members are compressed in parallel, and thereby the parallel operation is performed. During this parallel operation, the first elastic member is compressed between the output rotary hub and the pair of disk-like input members. Further, the second elastic member is compressed in the rotating direction between the intermediate disk-like member and the pair of disk-like input members. Therefore, the load torque exerted on the intermediate disk-like member can be small. Moreover, the strength of the intermediate disk-like member can be smaller than that in the prior art.

According to yet another aspect of the present invention, the damper disk assembly further includes a second relative rotation stop portion. The second relative rotation stop portion stops the relative rotation between the output rotary hub and the pair of disk-like input members when the torsion angle of the output rotary hub with respect to the input disk-like member pair reaches a third torsion angle larger than the second torsion angle.

In this damper disk assembly of the present invention, the first and second elastic members do not operate in series during the operations in the first and second stages. Therefore, the circumferential angular size of the second relative rotation stop portion can be sufficiently small.

According to yet another aspect of the present invention, the damper disk assembly further has such a feature that the first relative rotation stop portion is formed by and between the output rotary hub and the intermediate disk-like member. Further, the second relative rotation stop portion is formed by and between the intermediate disk-like member and the input disk-like member pair.

In this damper disk assembly of the present invention, the angular size of the second relative rotation stop portion formed by the intermediate disk-like member and the pair of disk-like input members can be sufficiently small.

According to yet another aspect of the present invention, the damper disk assembly further has such a feature that the second relative rotation stop portion is formed of an axial portion and a recess in the intermediate disk-like member. The axial portion extends axially for fixing the paired input disk-like members together. The recess in the intermediate disk-like member engages with the axial portion.

Since the second relative rotation stop portion can have a sufficiently small annular size, the recess in the intermediate disk-like member or the like can be small in circumferential size. Thereby, the first and second windows formed in the intermediate disk-like member can be increased in circumferential size and/or number.

According to yet another aspect of the present invention, the damper disk assembly further has such a feature that the output rotary hub has a hub and a sub-plate. The sub-plate extends radially outward from the hub and has a window engaged with the circumferentially opposite ends of the first elastic member.

According to yet another aspect of the present invention, the damper disk assembly further has such a feature that the output rotary hub further includes a damper for elastically coupling the hub and the sub-plate in the rotating direction. The damper has a lower rigidity than the rigidity of the first elastic member. In this damper disk assembly, the damper operates prior to operation of the first elastic member, and thereby achieves a low rigidity in the initial torsion characteristics.

According to yet another aspect of the present invention, the damper disk assembly further includes a pair of spring seats. The pair of spring seats are disposed on the circumferentially opposite ends of the first elastic member. The pair of spring seats are supported within the window in the sub-plate and the first window in the intermediate disk-like member. The compressing portion is formed in one of the pair of disk-like input members, and is spaced by a first space in the rotating direction from each of the spring seats.

According to yet another aspect of the present invention, the damper disk assembly further has such a feature in which the second relative rotation stop portion is provided with a second space in the rotating direction between the intermediate disk-like member and the pair of disk-like input members. Further, the second space is circumferentially angularly larger than the first space.

According to yet another aspect of the present invention, the first and second elastic members of the damper disk assembly are aligned in the rotating direction. Furthermore, the second elastic members are larger in number than the first elastic member.

According to yet another aspect of the present invention, the damper disk assembly further has such a feature that the first elastic member has a lower rigidity than the rigidity of the second elastic member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
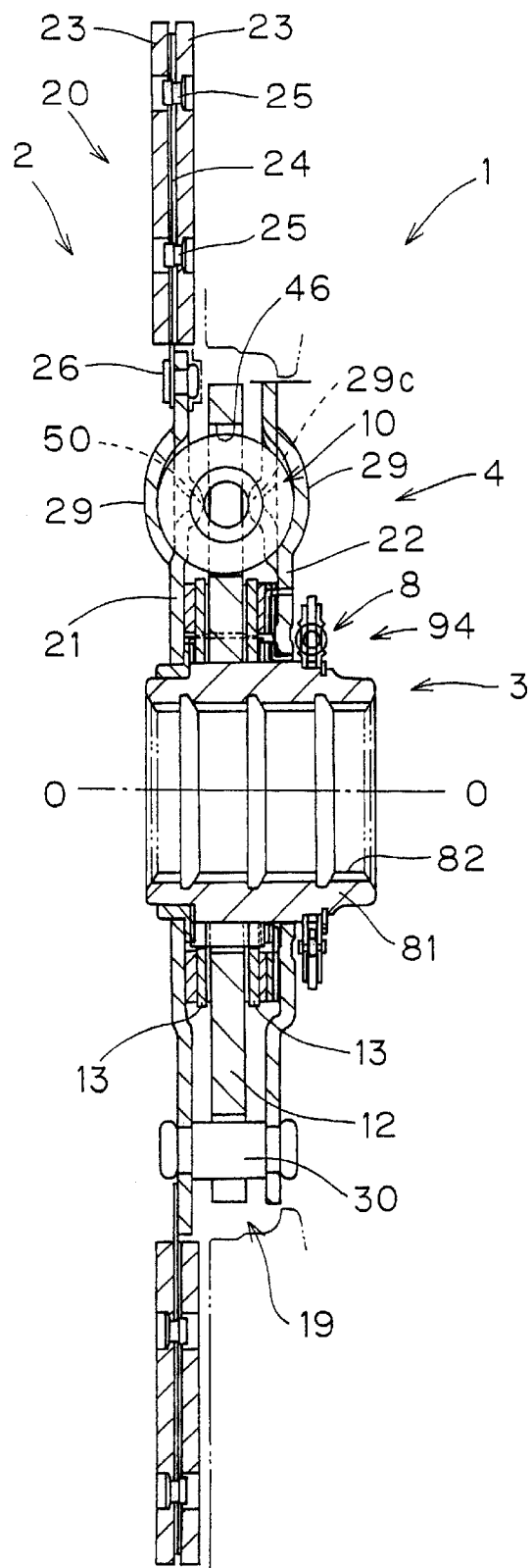
FIG. 1 is a schematic cross sectional view of a clutch disk assembly in accordance with a first embodiment of the present invention.
Figure 2:
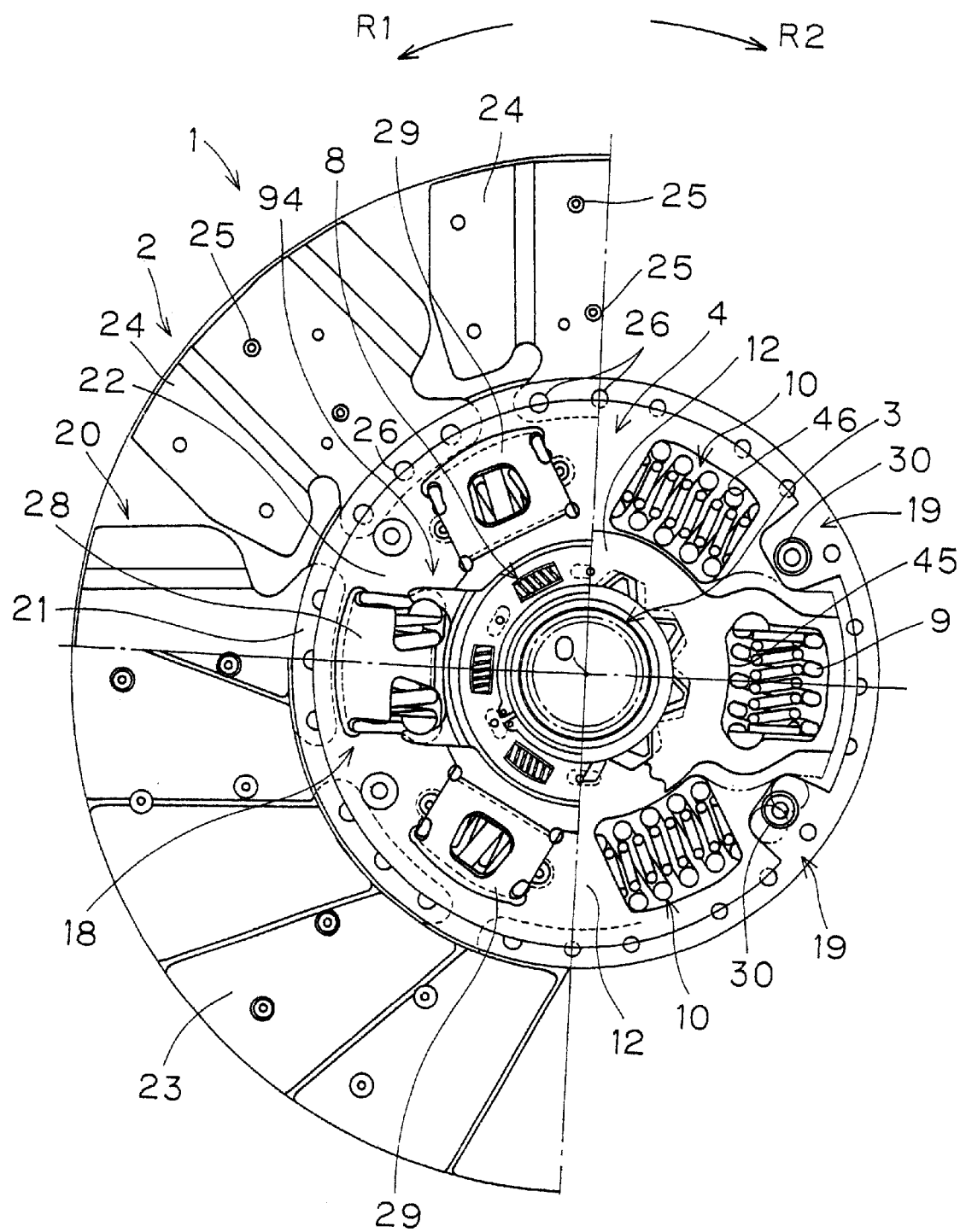
FIG. 2 is a side elevational view of the clutch disk assembly illustrated in FIG. 1 with certain portions broken away for the purpose of illustration.

FIG. 1 is a cross sectional view of a clutch disk assembly 1 showing an embodiment of the present invention. FIG. 2 is a side elevational view of the clutch disk assembly 1. The clutch disk assembly 1 is a power transmission device used in a clutch device of a vehicle. Clutch disk assembly 1 has a clutch function and a damper function. The clutch function is a function of engaging with and disengaging from a flywheel (not shown) for transmitting and interrupting a torque. The damper function is a function of absorbing and/or damping torque variations or the like, which are transmitted from the flywheel side. The damper function is performed by springs and/or other structures.

In FIG. 1, line O—O represents a rotation axis for a rotary shaft of the clutch disk assembly 1. An engine and the flywheel (both not shown) are arranged on the left side of clutch disk assembly 1 in FIG. 1. Furthermore, a transmission (not shown) is arranged on the right side of clutch disk assembly 1 in FIG. 1. R1 indicates a driving direction (positive direction) in a rotating direction of the clutch disk assembly 1, and R2 indicates a reverse direction (negative direction) as seen in FIG. 2.

Figure 3:
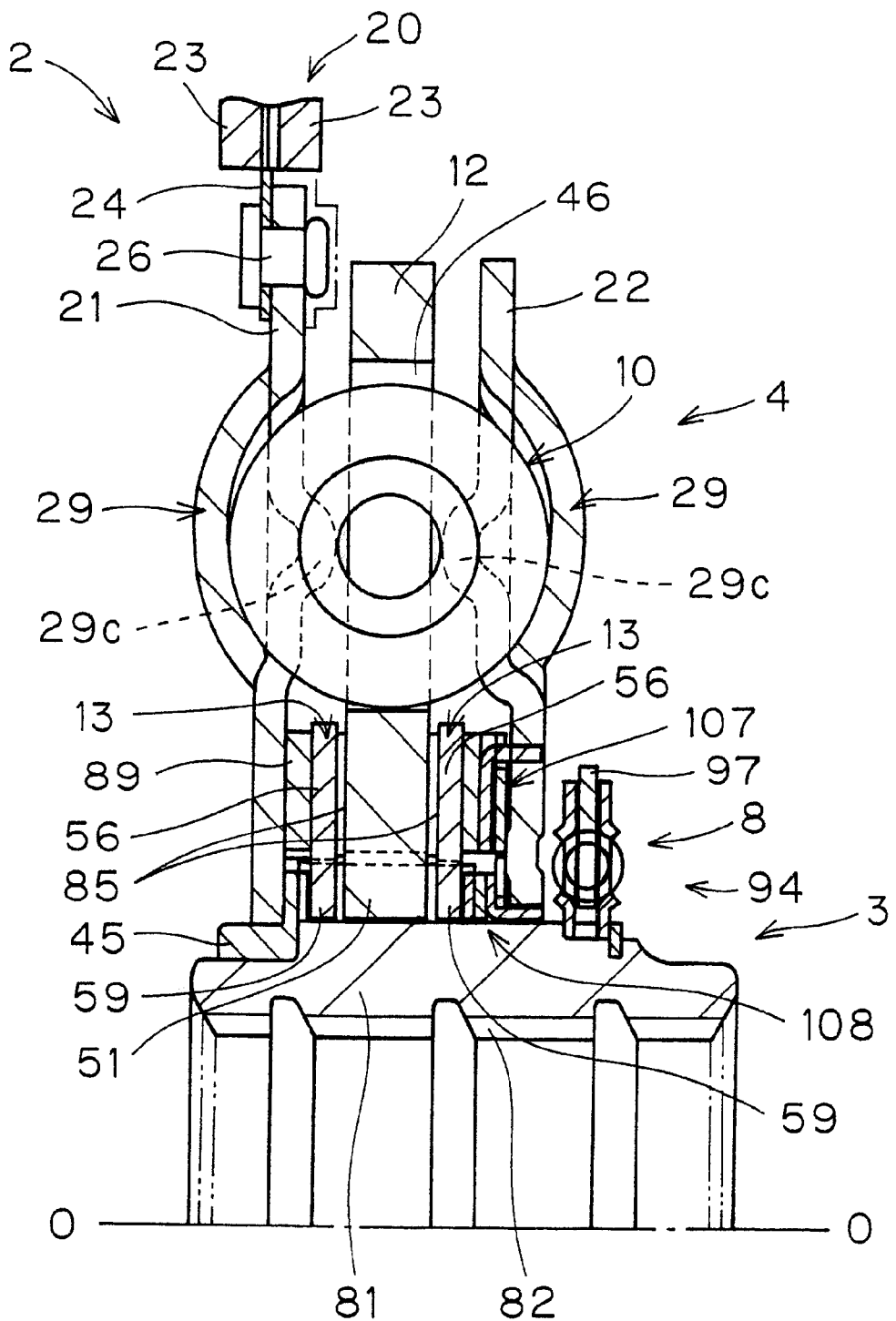
FIG. 3 is an enlarged fragmentary cross sectional view of a upper half of the clutch disk assembly illustrated in FIG. 1.

The clutch disk assembly 1 is basically formed of an input rotary member 2, a hub 3 and a damper mechanism 4. The hub 3 forms an output rotary member. The damper mechanism 4 is arranged between the input rotary member 2 and the hub 3. The damper mechanism 4 includes a plurality of elastic members made of springs. There are three different sets of springs 8, 9, and 10, which are arranged in series in damper mechanism 4 (springs 9 are considered first elastic members, springs 10 are considered second elastic members and springs 8 are considered third elastic members). Preferably, the rigidity of the springs 9 is lower than that of the springs 10. The damper mechanism 4 also includes a friction mechanism made of first and second friction mechanisms 107 and 108, respectively, as seen in FIG. 3.

Referring to FIGS. 1–8, the input rotary member 2 is a member for receiving a torque from the flywheel (not shown), as best seen in FIG. 1. The input rotary member 2 is primarily formed of a clutch plate 21, a retaining plate 22 and a friction disk 20. The clutch and retaining plates 21 and 22 are made of pressed members, each having an annular disk-like form. The clutch and retaining plates 21 and 22 are axially spaced from each other by a predetermined distance. The clutch plate 21 is disposed on the engine side, and the retaining plate 22 is disposed on the transmission side. The clutch and retaining plates 21 and 22 are fixedly coupled together by stop pins 30, which will be described later, so that a predetermined axial space is maintained between them. Further, the clutch and retaining plates 21 and 22 rotate together with each other.

The friction disk 20 is a portion to be pressed against the flywheel (not shown) by a pressure plate (shown in hidden lines in FIG. 1) for frictional engagement therewith. The friction disk 20 is primarily formed of friction facings 23 and cushioning plates 24. As best seen in FIG. 2, the cushioning plates 24 are formed of a plurality of plate members which are aligned in the circumferential direction, and each has radially inner portions fixed to the clutch plate 21 by rivets 26. The friction facings 23 are fixedly coupled to the opposite surfaces of the cushioning plates 24 by a plurality of rivets 25.

Figure 5:
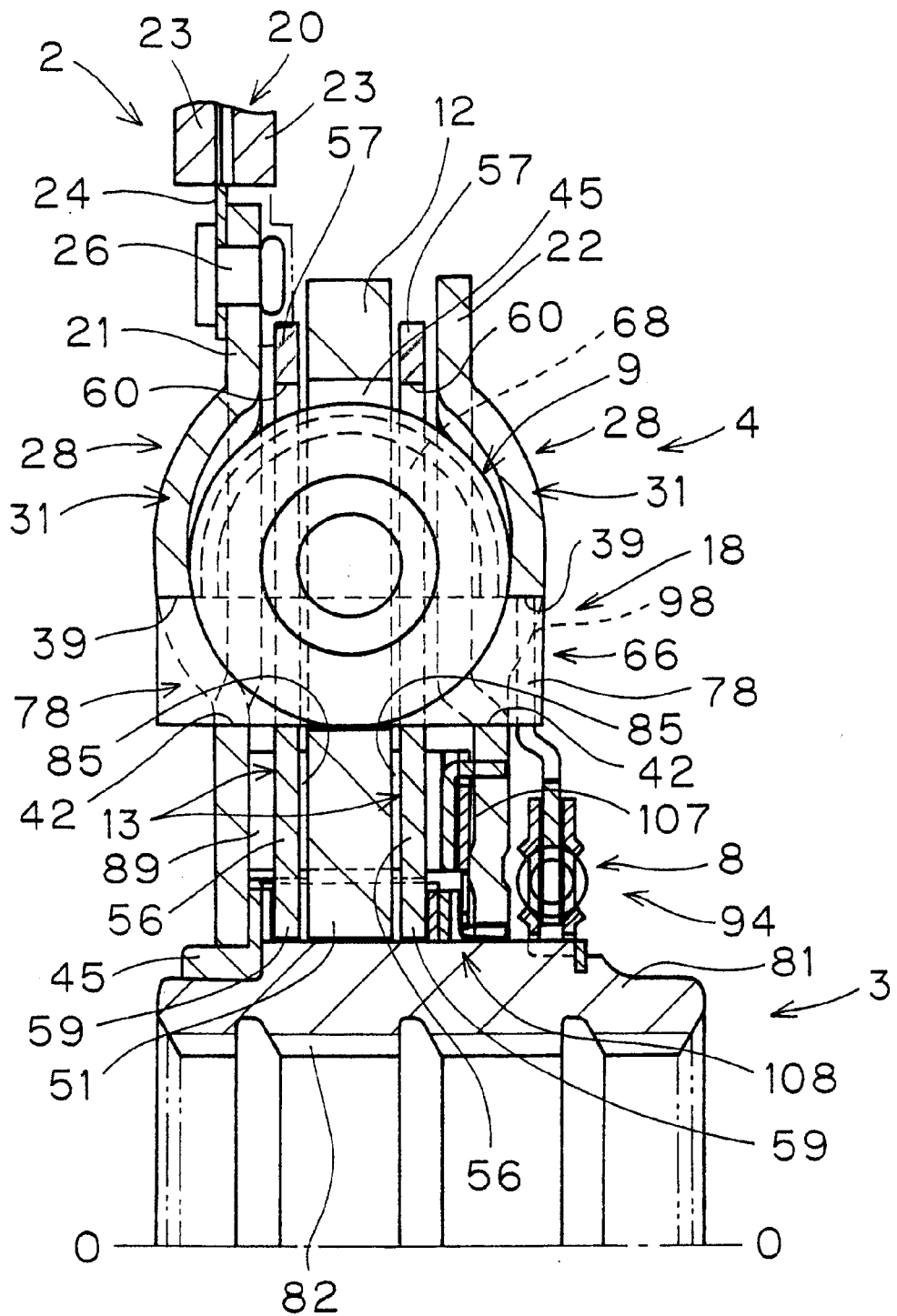
FIG. 5 is an enlarged, fragmentary cross sectional view of the upper half of the clutch disk assembly illustrated in FIG. 1 with the clutch disk assembly rotated to show an alternate portion of the clutch disk assembly.

The clutch plate 21 is provided with first and second windows 28 and 29 circumferentially aligned in a semi-alternating arrangement in the rotating direction. The retaining plate 22 has similar windows 28 and 29 aligned with windows 28 and 29 formed in clutch plate 21, as best seen in FIGS. 3 and 5. In this embodiment, the first windows 28 are two in number, and the second windows 29 are four in number. The two first windows 28 are diametrically opposed to each other, each window 28 having a window 29 arranged on opposite circumferential sides. Accordingly, there are two windows 29 adjacent each other between windows 28 in the circumferential direction.

Figure 8:
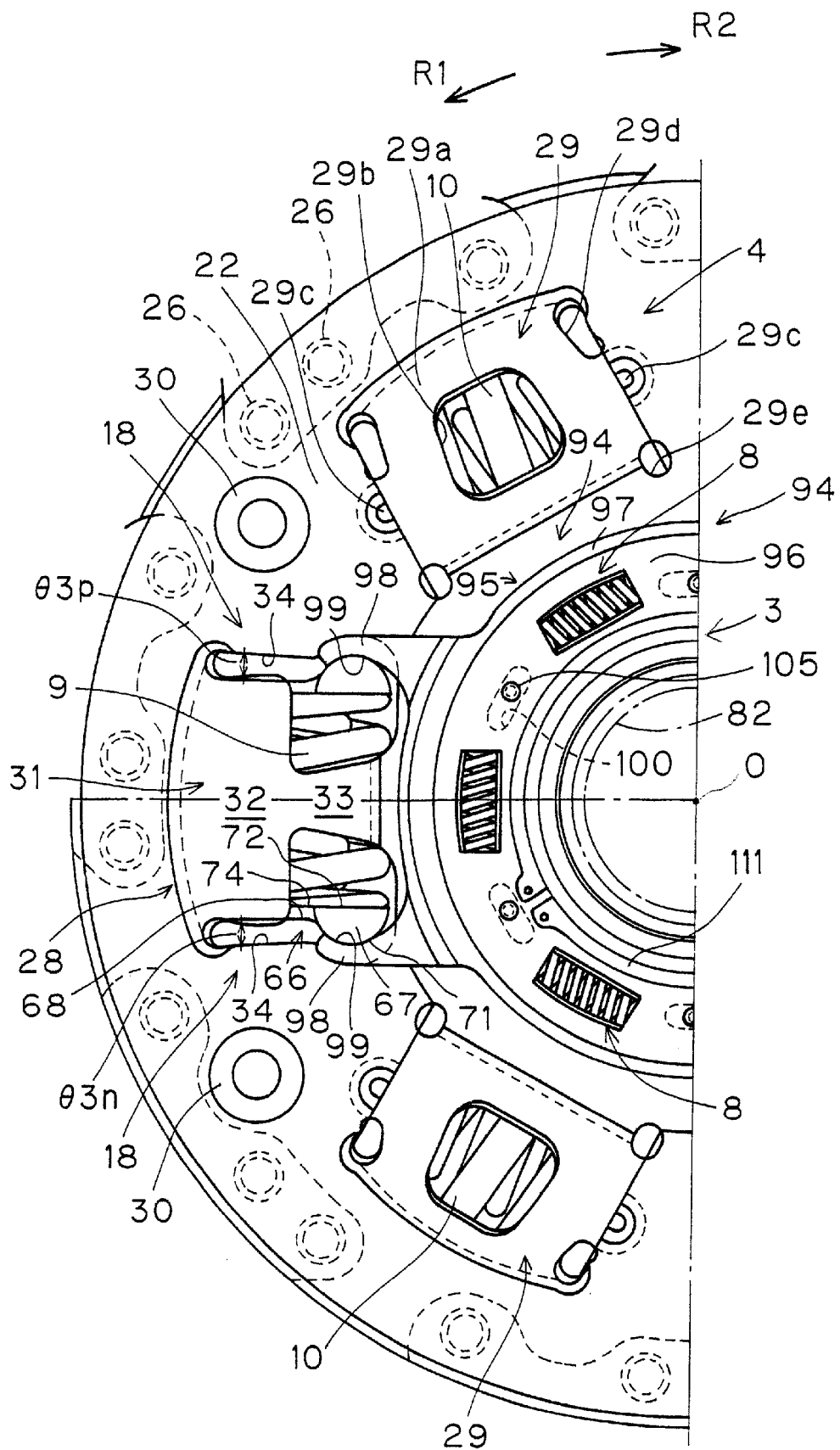
FIG. 8 is an enlarged, partial side elevational view of a portion of the clutch disk assembly illustrated in FIG. 2.
Figure 9:
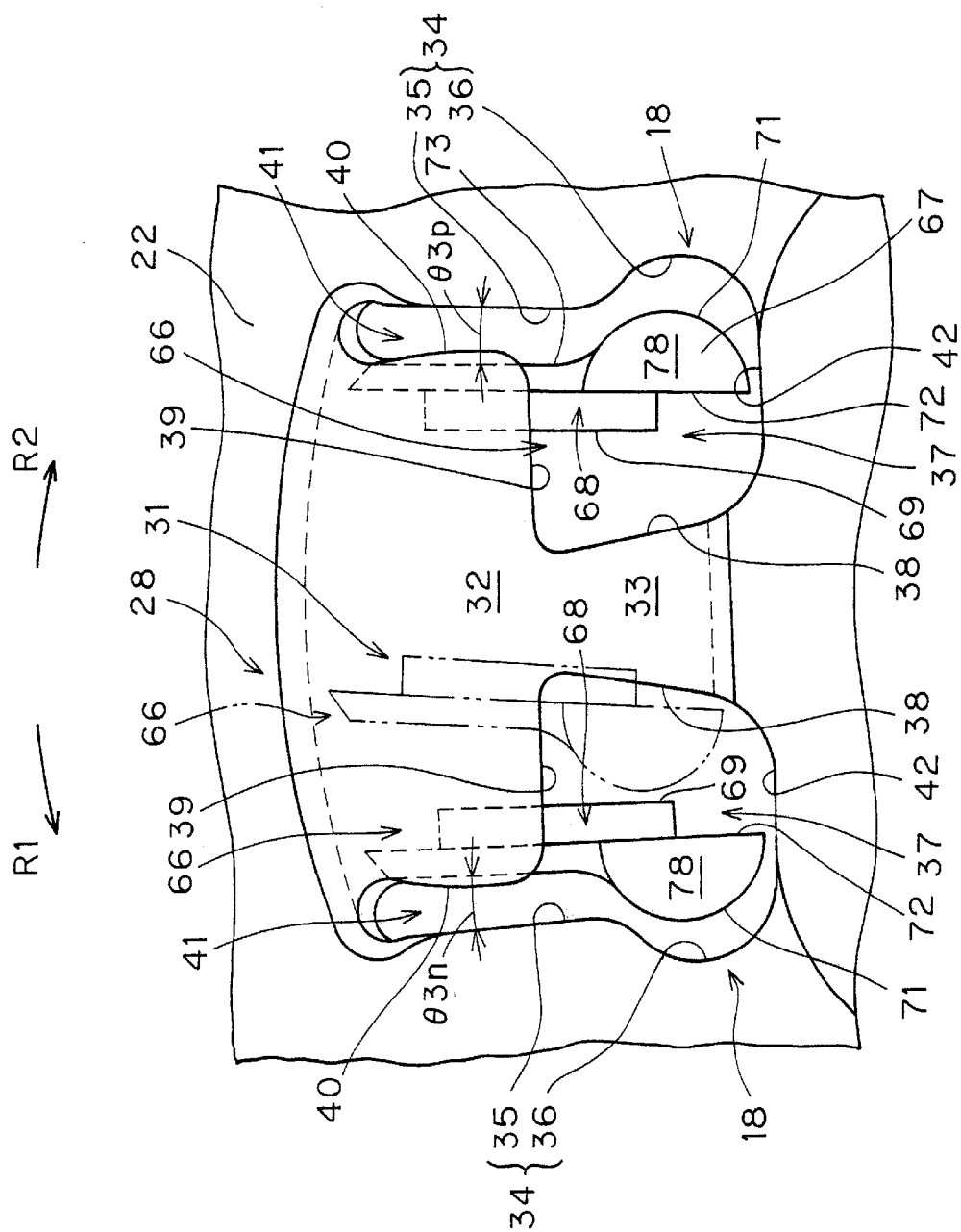
FIG. 9 is an enlarged, side elevational view of a portion of the clutch disk assembly illustrated in FIGS. 1–8 showing a relationship between a window and a pair of spring seats.

Referring to FIG. 9, the first windows 28 will now be described in more detail. Each first window 28 is formed of a portion, which is formed by drawing effected on the main body of the clutch plate 21 or retaining plate 22. The drawn portion projects axially outward, from the main body of the respective plates 21 and 22. Each first window 28 is circumferentially long and has an axially covering portion 31. The axially covering portion 31 has a tunnel-like form that is radially continuous. The axially covering portion 31 is formed of radially outer and inner portions 32 and 33, respectively as best seen in FIGS. 8 and 9.

The radially outer portion 32 of each axially covering portion 31 is circumferentially long. The radially inner portion 33 of each axially covering portion 31 has a circumferential width smaller than that of the radially outer portion 32 and extends radially inward from radially outer portion 32. Radially inner portion 33 is formed on a circumferentially central portion of the outer portion 32. The radially outer portion 32 has a pair of third edges 40 on the circumferentially opposite ends as well as a pair of second edges 39 on the radially inner end on opposite sides of radially inner portion 33. The radially inner portion 33 has a pair of first edges 38 on the circumferentially opposite ends thereof. In each first window 28, the first edges 38 are located circumferentially and radially inside the third edges 40.

Each first window 28 has a pair of circumferentially supporting portions 34 formed on the circumferentially opposite ends of each first window 28, respectively. Each circumferentially supporting portion 34 is formed by a section of one of the plates 21 and 22. More specifically, each circumferentially supporting portion 34 is formed of a linear portion 35 and a semicircular portion 36 located radially inside the linear portion 35. The linear portion 35 extends straight and linearly, and the semicircular portion 36 has a smoothly curved form and is concave circumferentially outward from the linear portion 35. Owing to the structures described above, a first aperture 41 is formed between each of the axially covering portions 31 and each of the circumferentially supporting portions 34 located at circumferentially opposite sides thereof. Further, a pair of second apertures 37 continuous to the first apertures 41 are formed between the radially inner portion 33 of each axially covering portion 31 and the circumferentially supporting portions 34 located at circumferentially opposite sides thereof.

More specifically, each first aperture 41 is formed between one of the third edges 40 of the radially outer portion 32 and one of the linear portions 35 of the circumferentially supporting portion 34. Each second aperture 37 is defined by one second edge 39 of one outer portion 32, one first edge 38 of one inner portion 33, one circumferentially supporting portion 34 and one radially inner edge 42, as best seen in FIG. 9.

As shown in FIG. 8, each second window 29 is also formed of a portion, which projects axially from the clutch and retaining plates 21 and 22, and is formed by drawing. Each second window 29 is radially continuous, and is cut at its circumferentially opposite ends. Each second window 29 is primarily formed of an axially covering portion 29a. Each axially covering portion is provided with an aperture 29b.

Each aperture 29b is formed in the circumferentially and radially central position of each axially covering portion 29a. The aperture 29b has a trapezoidal form. The radially inner side of each aperture 29b is longer than the radially outer side. A recess 29d is formed in each circumferentially opposite end of each axially covering portion 29, and particularly in the radially outer portions, respectively.

An aperture 29e extending into the clutch or retaining plate 21 or 22 is formed in each circumferentially opposite end of each axially covering portion 29a, and particularly in the radially inner portions, respectively. Circumferentially supporting portions 29c are formed on the circumferentially opposite sides of each second window 29. Each circumferentially supporting portion 29c is formed of a section of one of the plates 21 and 22. Each circumferentially supporting portion 29c projects axially inward from the clutch plate 21 or retaining plate 22, and is formed by drawing. Each circumferentially supporting portion 29c is formed in the radially middle or central portion of the respective second window 29.

The clutch and retaining plates 21 and 22 are each provided with a radially central aperture. The hub 3 (i.e., the output rotary member) is disposed in these central apertures. As seen in FIG. 1, the hub 3 is formed of a cylindrical boss 81 extending axially and outer teeth 83 extending radially outward from the boss 81. The boss 81 is provided at its center with a splined aperture 82 engaged with a shaft extending from the transmission (not shown). Each outer tooth 83 has a radial section, which converges radially outward and has a predetermined axial length.

Figure 11:
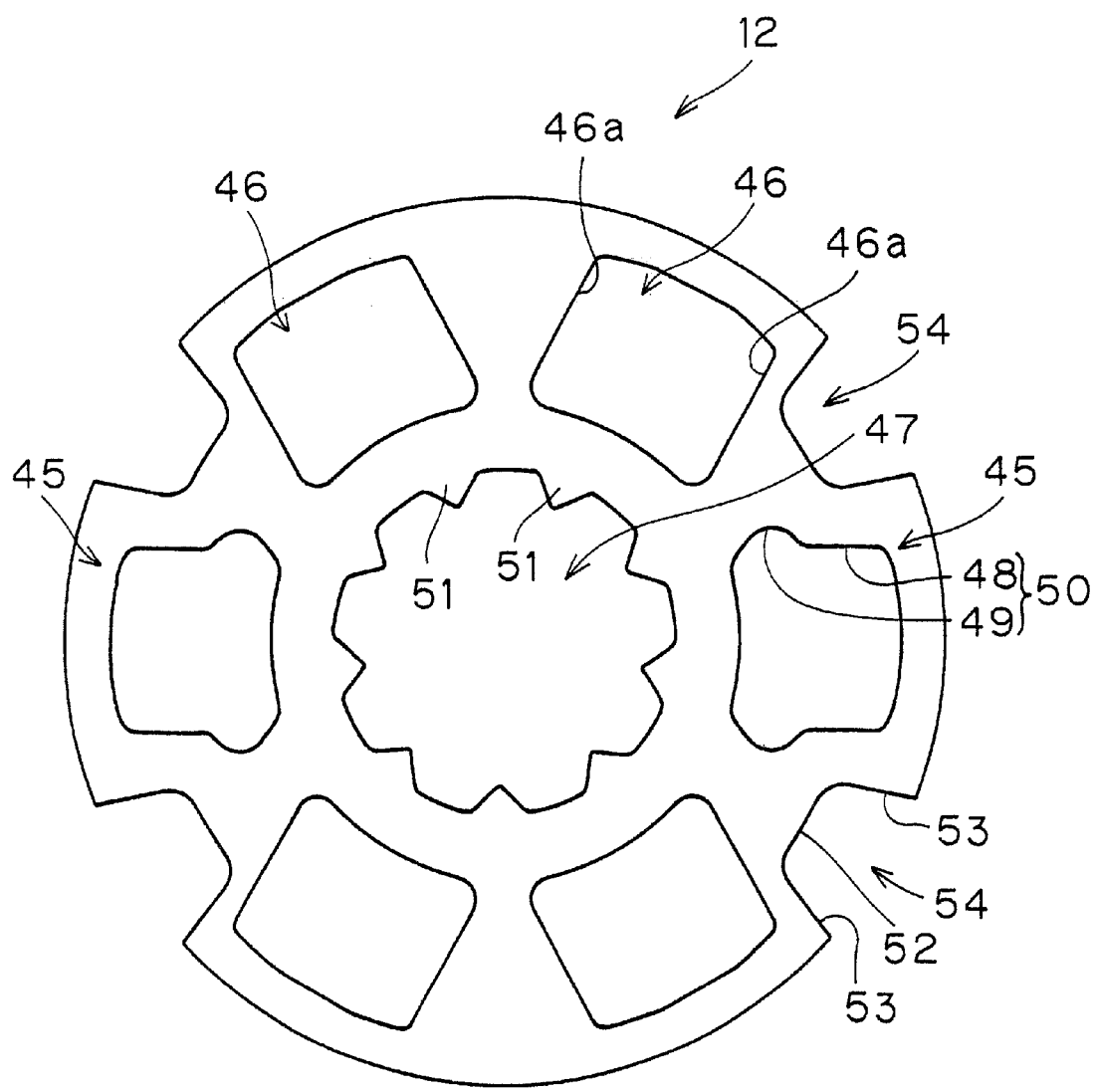
FIG. 11 is a side elevational view of a hub flange for the clutch disk assembly illustrated in FIGS. 1–10.
Figure 13:
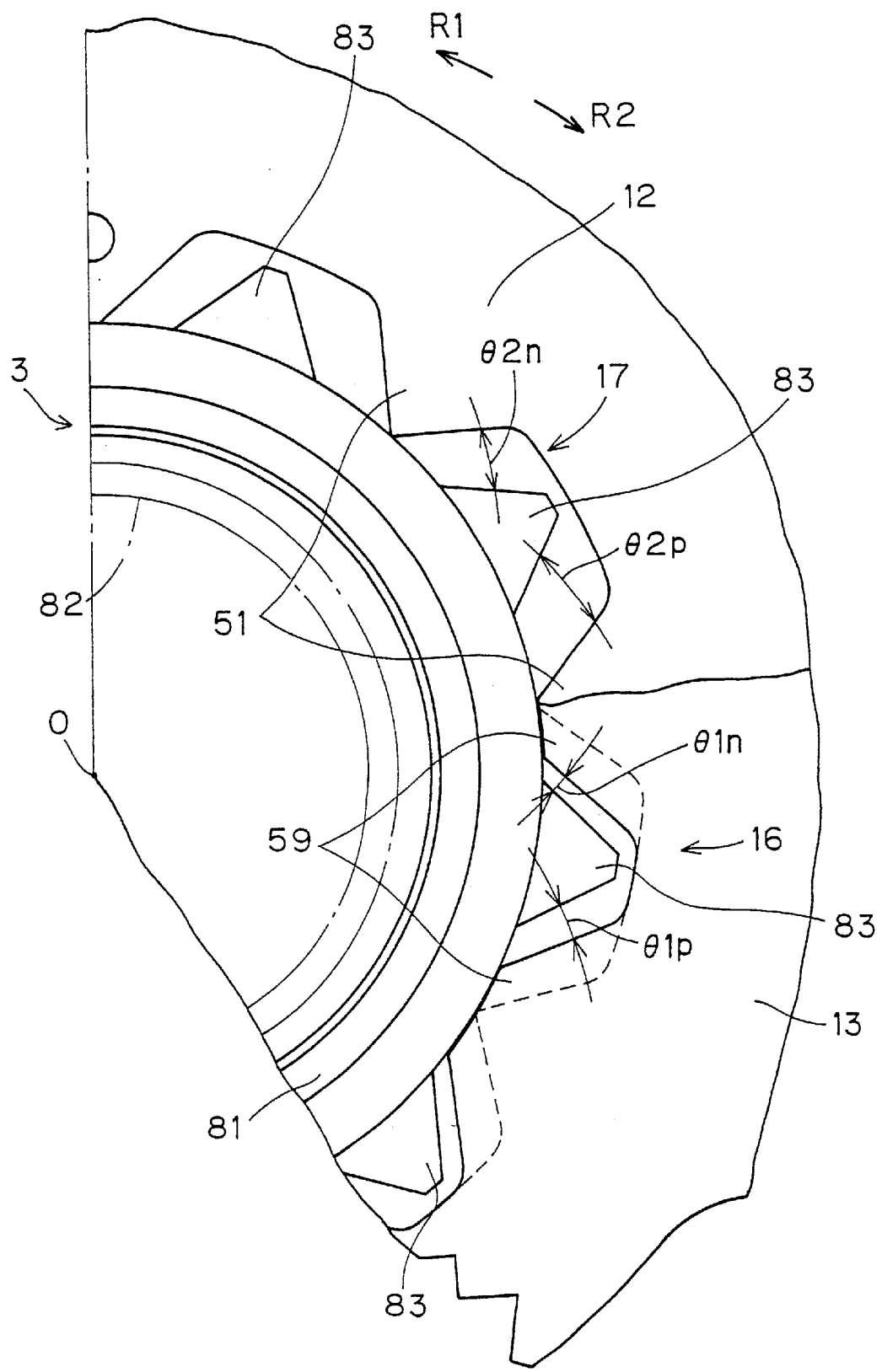
FIG. 13 is an enlarged, side elevational view of a portion of the clutch disk assembly illustrated in FIGS. 1–10 with certain parts broken away to show a relationship of the hub with respect to the sub-plate and the hub flange.

The hub flange 12 is a disk-like member, which is located radially outside the hub 3 and axially between the clutch and retaining plates 21 and 22. As shown in FIG. 11, the hub flange 12 is provided with a central aperture 47. Thus, the hub flange 12 has an annular form. The hub flange 12 is provided at its inner periphery with a plurality of inner teeth 51. Each inner tooth 51 has a radial section converging radially inward. Each inner tooth 51 preferably converges radially inwardly such that side walls of the tooth intersect at a radially innermost location. As shown in FIG. 13, circumferential spaces are kept between the inner and outer teeth 51 and 83, respectively, to form a first stop 17.

More specifically, a positive-side space of a circumferential angle $\theta 2p$ is maintained between the outer tooth 83 and the inner tooth 51 on the R1 side thereof (i.e. measured in the R1 direction from inner tooth 51 to outer tooth 83). Further, a negative-side space of a circumferential angle of $\theta 2n$ is maintained between the outer tooth 83 and the inner tooth 51 on the R2 side thereof (i.e. measured in the R2 direction from inner tooth 51 to outer tooth 83). A sum of $\theta 2p$ and $\theta 2n$ is equal to an angle $\theta 2$ through which the operation is allowed in the first stop 17. More specifically, $\theta 2p$ is preferably equal to 11.5°, $\theta 2n$ is preferably equal to 8.5°. Therefore, $\theta 2$ is preferably equal to 20°. However, these values are merely preferred examples, and are not intended to restrict the invention.

As seen in FIG. 11, the hub flange 12 is provided with a plurality of first and second windows 45 and 46, each of which is open on its axially opposite ends. The first windows 45 are two in number, and the second windows 46 are four in number. The first windows 45 correspond to the first windows 28 and the second windows 46 correspond to the second windows 29, respectively. The two first windows 45 are diametrically opposed to each other. Each first window 45 is provided at its circumferentially opposite ends with circumferentially supporting portions 50. Each circumferentially supporting portion 50 of each first window 45 is formed of a linear portion 48 and a semicircular portion 49 located radially inside the linear portion 48. The linear portion 48 extends straight and linearly. The semicircular portion 49 is curved and concave circumferentially outward from the linear portion 48.

Each second window 46 is provided at its circumferentially opposite ends with circumferentially supporting portions 46a. The hub flange 12 is provided at its radially outer edge with a plurality of recesses 54 aligned in the circumferential direction. Preferably there are four recesses 54, and recesses 54 are positioned on the circumferentially opposite sides of the first window 45, as seen in FIG. 11. Each recess 54 extends radially inward from the outer periphery of hub flange 12 to a position that is radially inside the outer radial peripheries of the first and second windows 45 and 46, respectively. Each recess 54 is defined by a circumferentially extending first edge 52 and a pair of second edges 53 on the opposite circumferential sides of first edge 52. The first edge 52 has a predetermined circumferential width. The second edges 53 diverge radially outward from the opposite ends of the first edge 52.

The recesses 54, the first windows 45 and the second windows 46 have radially overlapping portions. Therefore, increasing circumferential or angular size of the recesses 54 results in a decrease in number and/or angular size of the windows 45 and 46. In this embodiment, since each recess 54 has a relatively small circumferential angle of about 15 to 20 degrees, the number and/or angular size of the windows 45 and 46 can be increased as shown in FIG. 11. Thereby, the damper function allowing a large torsional angle and a low rigidity can be achieved.

Figure 12:
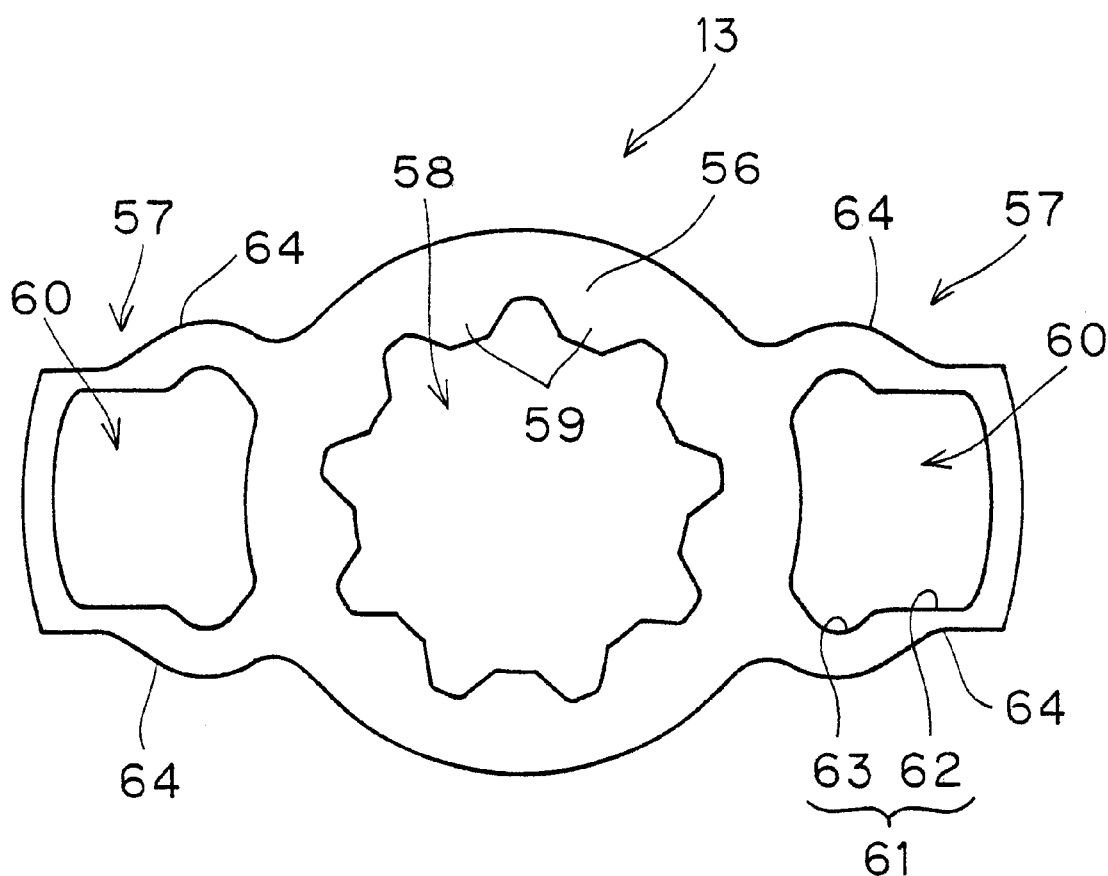
FIG. 12 is a side elevational view of a sub-plate for the clutch disk assembly illustrated in FIGS. 1–10.

As seen in FIG. 1, the sub-plates 13 are formed of as a pair of plate members and are disposed on the axially opposite sides of the hub flange 12. Each sub-plate 13 is adjacent to the hub flange 12. As shown in FIG. 12, each sub-plate 13 is formed of an annular portion 56 and a pair of engagement portions 57. The annular portion 56 has a disk-like form. The annular portion 56 is provided with a central aperture 58. The central aperture 58 of annular portion 56 is provided at its inner periphery with a plurality of inner teeth 59. Each inner tooth 59 has a radial section converging radially inward.

As shown in FIGS. 11–13, the circumferential locations of inner teeth 59 correspond to circumferential locations of the inner teeth 51 of hub flange 12. Each inner tooth 59 has a circumferential width larger than the inner teeth 51. Thus, each inner tooth 59 has circumferentially opposite ends which project circumferentially outward beyond the circumferentially opposite ends of the inner tooth 51. A predetermined circumferential space is formed between the inner and outer teeth 59 and 83.

The inner teeth 59 and outer teeth 83 form a third stop 16. A positive-side space of a circumferential angle of $\theta 1p$ is formed between each outer tooth 83 and each inner tooth 59 on the R1 side thereof (i.e. measured in the R1 direction from inner tooth 59 to outer tooth 83). A negative-side space of a circumferential angle of $\theta 1n$ is formed between each outer tooth 83 and each inner tooth 59 on the R2 side thereof (i.e. measured in the R2 direction from inner tooth 59 to outer tooth 83). $\theta 1$ is equal to the sum of $\theta 1p$ and $\theta 1n$ and is equal to an entire operation angle in the third stop 16. $\theta 1p$ is smaller than $\theta 2p$, and $\theta 1n$ is smaller than $\theta 1n$. For example, $\theta 1p$ is preferably 5.5°, and $\theta 1n$ is preferably 3.0°. Therefore, for example, $\theta 1$ is preferably 8.5 degrees. However, these values are merely preferred examples, and are not intended to restrict the invention.

As seen in FIG. 12, each engagement portion 57 is a portion projected radially outward from each annular portion 56 of each sub-plate 13. Each pair of engagement portions 57 are formed in diametrically opposed positions of each sub-plate 13. Each engagement portion 57 is provided with a window 60. The windows 60 correspond to the first windows 45 and 28. Circumferentially supporting portions 61 are formed in the circumferentially opposite ends of each window 60. Each circumferentially supporting portion 61 is formed of a linear portion 62 and a semicircular portion 63 located radially inside the linear portion 62. The linear portion 62 has a straight form. The semicircular portion 63 is smoothly curved and is concave circumferentially outward from the linear portion 62. As seen in FIG. 3, a spacer 85 is fixed to the annular portion 56 of each sub-plate 13. The spacer 85 is in contact with the inner annular portion of the hub flange 12. The spacer 85 is formed of a member having a low friction coefficient.

Figure 10:
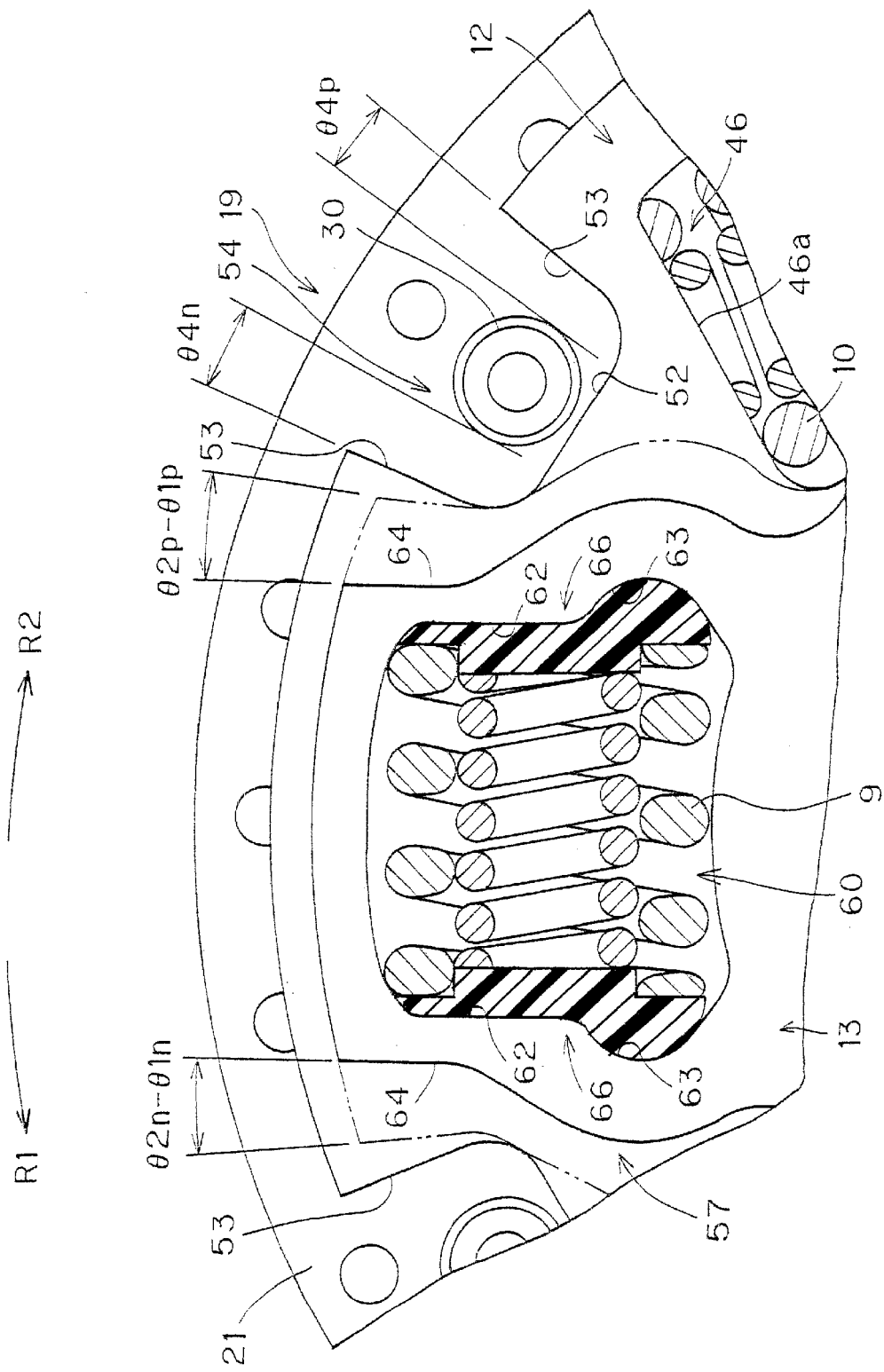
FIG. 10 is an enlarged, side elevational view of a portion of the clutch disk assembly illustrated in FIGS. 1–8 with portion broken away to show the arrangement of a sub-plate relative to the window and spring seats.

As seen in FIG. 2, each first spring 9 is accommodated in a space defined by one first windows 45, one window 60 and one first window 28. Preferably, there are two first springs 9 corresponding to the number of first windows 45, windows 60 and first windows 28. Each first spring 9 is formed of a pair of coil springs. More specifically, each first spring 9 is formed of a large coil spring and a small coil spring disposed within the large coil spring. As seen in FIG. 10, spring seats 66 are disposed on the circumferentially opposite ends of each first spring 9. The spring seats 66 are preferably made of resin material.

Figure 14:
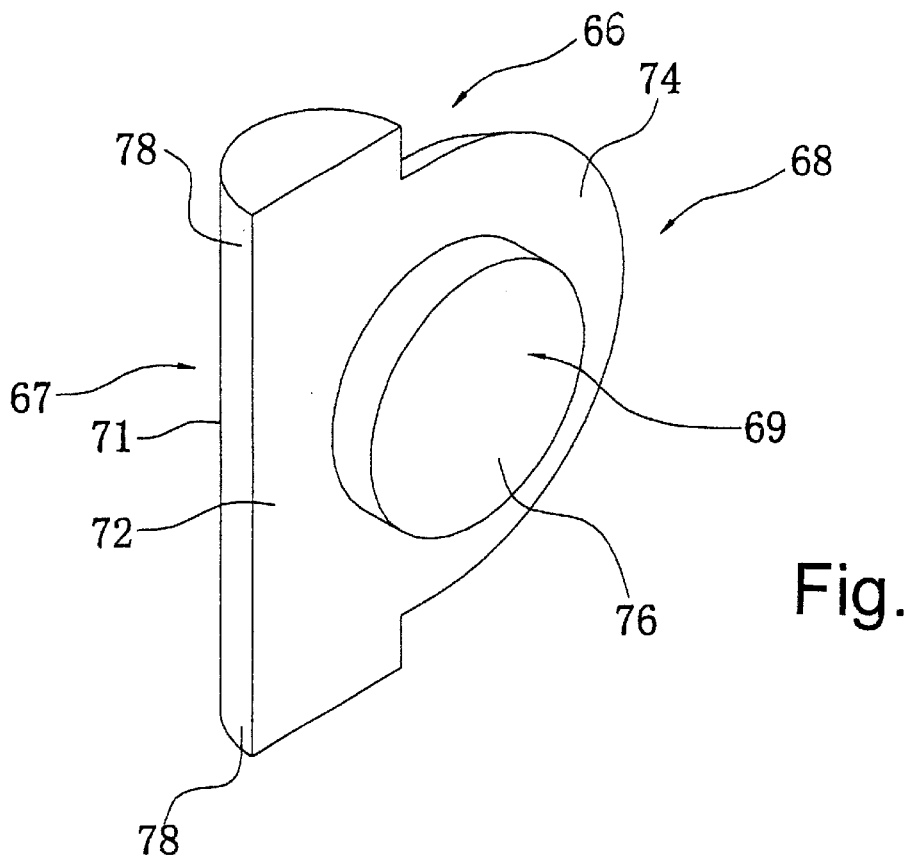
FIG. 14 is an enlarged, perspective view of a spring seat for the clutch disk assembly illustrated in FIGS. 1–10.
Figure 15:
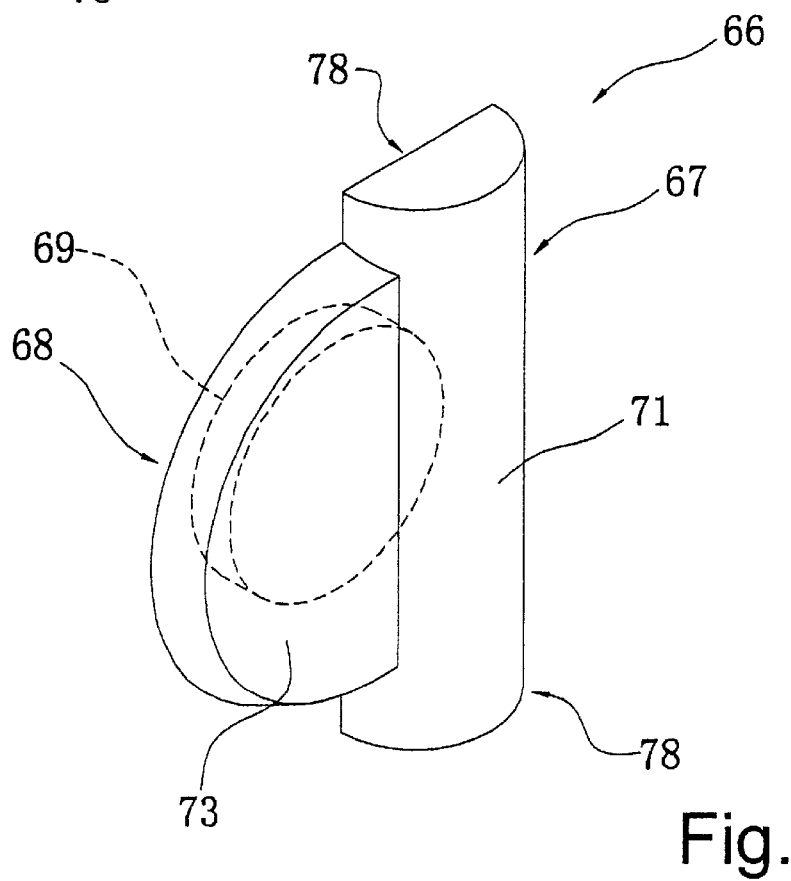
FIG. 15 is a reverse perspective view of the spring seat illustrated in FIG. 14.
Figure 16:
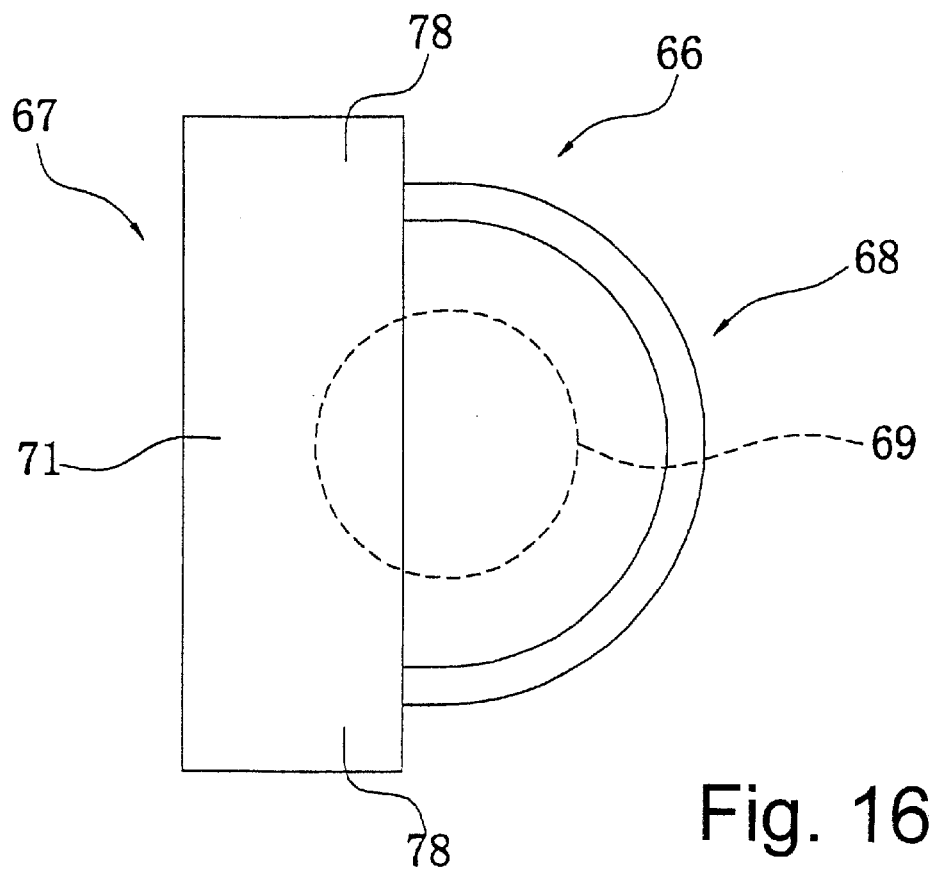
FIG. 16 is a rear elevational view of the spring seat illustrated in FIGS. 14–15.
Figure 17:
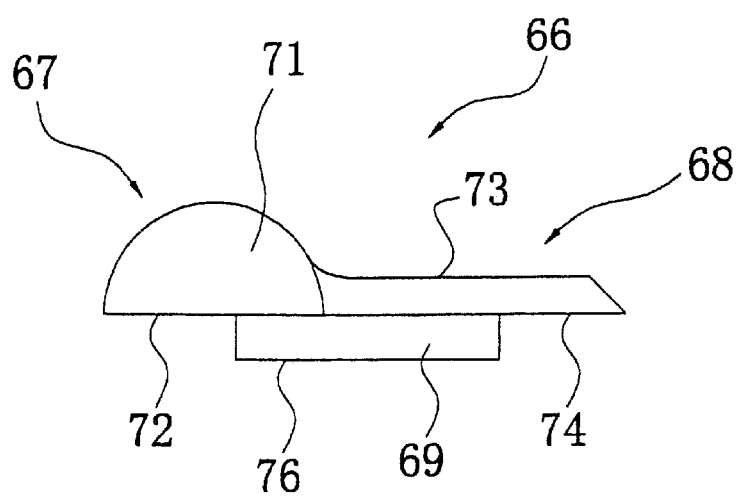
FIG. 17 is a side elevational view of the spring seat illustrated in FIGS. 14–16.

As shown in FIGS. 14–17, each spring seat 66 is primarily formed of a semi-columnar portion 67 and a seat portion 68. The semi-columnar portion 67 is axially long, and has a semicircular section. Thus, the semi-columnar portion 67 has a curved surface 71 and a flat surface 72. The seat portion 68 projects from the semi-columnar portion 67. The seat portion 68 has a flat surface 74 continuous to the flat surface 72. As seen in FIG. 15, a rear surface 73 is of seat portion 68 is located on the side opposite to the flat surface 74.

As seen in FIG. 14, a circular projected portion 69 is formed on the seat surface. The seat surface is formed of the flat surfaces 72 and 74. The projected portion 69 has a circular end surface 76. Referring to FIGS. 11, 12, and 15, the rear surface 73 of the spring seat 66 is in contact with the circumferentially supporting portion 50 of the hub flange 12 and the circumferentially supporting portions 61 of the sub-plates 13. The rear surface 73 of the spring seat 66 is supported in the rotating direction of the clutch disk assembly. More specifically, the axially middle portion of the curved surface 71 is in contact with the semicircular portion 49 of the circumferentially supporting portion 50 of hub flange 12. The axially middle portion of the rear surface 73 is in contact with the linear portion 48 of the circumferentially supporting portion 50 of hub flange 12.

Also, the curved surface 71 of each spring seat 66 is in contact with one semicircular portion 63 of one circumferentially supporting portion 61 of each sub-plate 13. As best seen in FIG. 10, the rear surface 73 is in contact with one linear portion 62 of one circumferentially supporting portion 61 of each sub-plate 13. Each end of the large coil spring of the first spring 9 is in contact with the flat surfaces 72 and 74 around the projected portion 69 of one spring seat 66. The inner periphery of the coil at the each end of each large coil spring of each first spring 9 is engaged with the outer peripheral surface of the projected portion 69 of one spring seat 66. Each end of each small coil spring of each first spring 9 is in contact with the end surface 76 of the projected portion 69 of one spring seat 66.

As seen in FIG. 14, each spring seat 66 is provided with a pair of engagement portions 78. Each engagement portion 78 projects axially from the semi-columnar portion 67. Thus, each engagement portion 78 extends beyond the seat portion 68. As seen in FIG. 9, each engagement portion 78 extends within the one of the second apertures 37 of each one of the first windows 28. More specifically, the engagement portion 78 projects axially from the plate portions of the clutch and retaining plates 21 and 22, respectively. Furthermore, the engagement portion 78 has the end extended to the same position as the axially covering portions 31 of the first windows 28. The engagement portion 78 is disposed in the outer position, in the rotating direction, within the second aperture 37 so that the engagement portions 78 can move circumferentially inward within the second apertures 37.

The rear side of each spring seat 66 is circumferentially opposed to the circumferentially supporting portions 34 of the clutch and retaining plates 21 and 22 with a predetermined space therebetween. Each spring seat 66 on the R2 side is angularly spaced by an amount θ3p from the clutch and retaining plates 21 and 22. each spring seat 66 on the R1 side is angularly spaced by an amount θ3n from the clutch and retaining plates 21 and 22. More specifically, θ3p and θ3n are each preferably equal to 3.3°. However, these values are merely preferred examples, and are not intended to restrict the invention. According to the structure described above, when each circumferentially supporting portion 34 rotates θ3p in the R1 direction or θ3n in the R2 direction relatively to the spring seats 66, it comes into contact with the spring seats 66. Thereafter, the circumferentially supporting portions 34 form compressing portions 18 that compress the first springs 9.

Referring again to FIG. 2, the second coil springs 10 are accommodated in the space defined by the second windows 46 and 29. Preferably there are four second springs 10 corresponding to the number of openings formed by windows 46 and 29. The second coil springs 10 are formed of coil springs. More specifically, each second coil spring 10 is formed of a large coil spring and a small coil spring disposed within the large coil spring. Each end of the second coil springs 10 is in contact with the circumferentially supporting portions 46a and 29c (i.e. of windows 29 formed in clutch plate 21 and retaining plate 22), as best seen in FIGS. 1–3, 8 and 11. In this initial state, each second spring 10 is already compressed in the rotating direction to generate a predetermined initial load.

The stop pins 30 fixedly couple the radially outer portions of the clutch and retaining plates 21 and 22 together, as seen in FIG. 2. As shown in FIG. 10, the stop pins 30 extend through the recesses 54 formed in the hub flange 12. Each stop pin 30 is spaced from second edges 53 to provide a second stop 19. A positive-side space of a circumferential angle of θ4p is formed between each stop pin 30 and the second edge 53 on the R2 side of each stop pin 30. Similarly, a negative-side space of a circumferential angle of θ4n is formed between each stop pin 30 and the second edge 53 on the R1 side. θ4p is larger than θ3p, and θ4n is larger than θ3n. More specifically, θ4p is preferably equal to 4.6°, and θ4n is preferably equal to 4°. These values are merely preferred examples, and are not intended to restrict the invention.

As seen in FIG. 1, the clutch disk assembly 1 preferably includes a first-stage damper 94. The first-stage damper 94 is a mechanism for exhibiting low-rigidity characteristics in a torsional angle range before the sub-plates 13 engage with the hub 3. The first stage damper 94 is disposed radially outside the boss 81 and axially outside the retaining plate 22. In other words, first stage damper 94 is preferably arranged on a transmission side of retaining plate 22.

Figure 6:
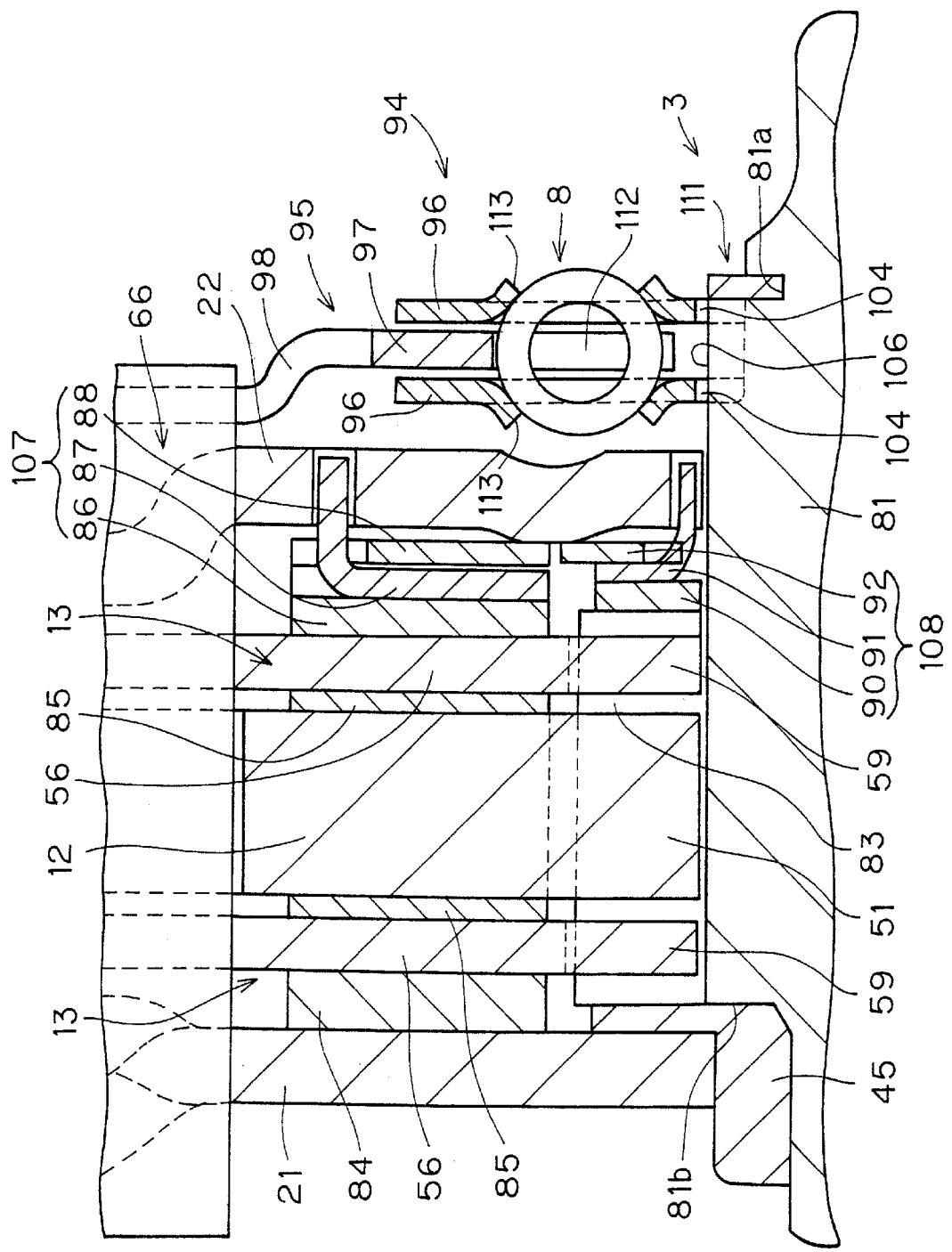
FIG. 6 is an enlarged, fragmentary cross sectional view of a portion of the clutch disk assembly illustrated in FIG. 5.
Figure 7:
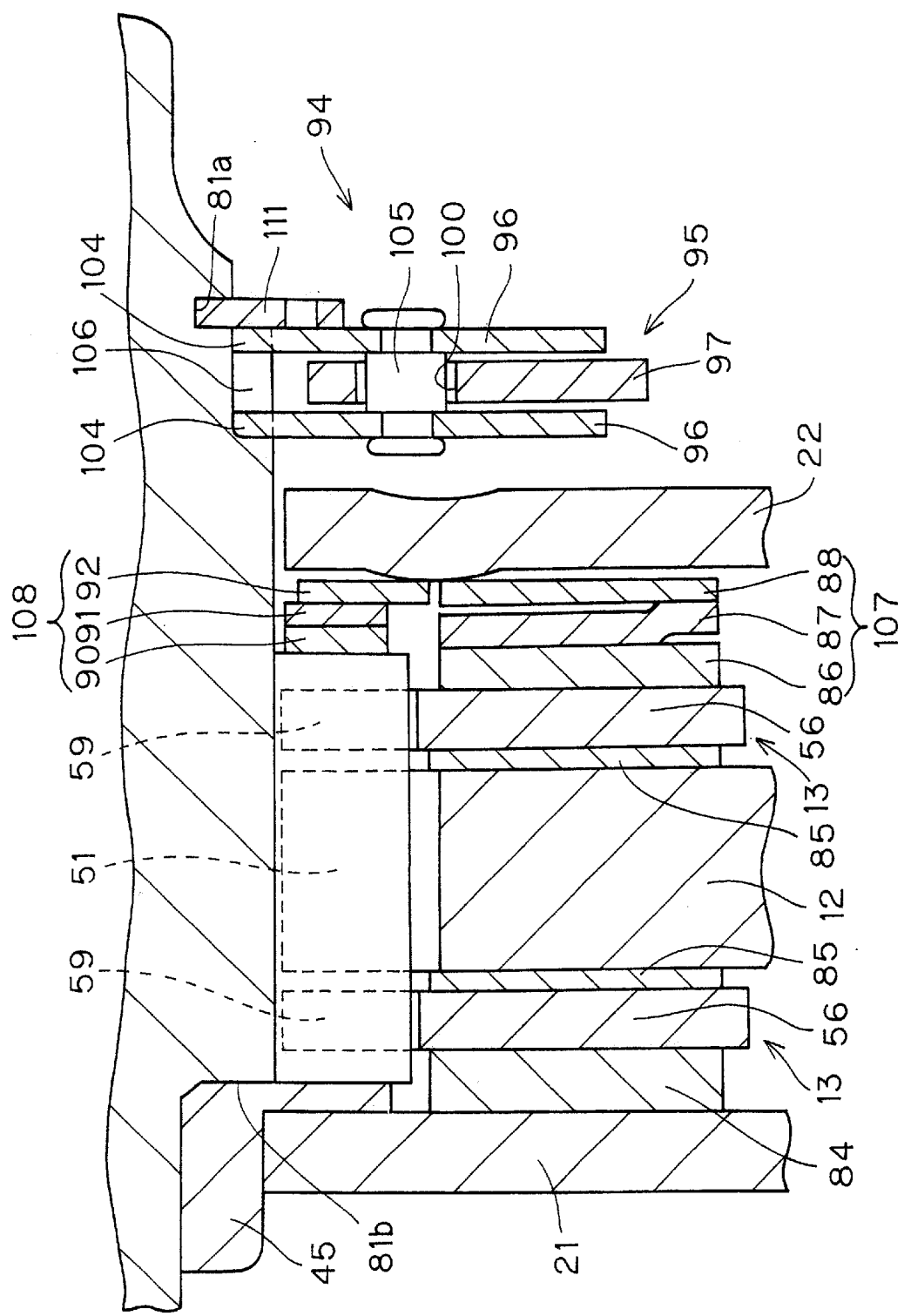
FIG. 7 is an enlarged, fragmentary cross sectional view of a portion of the clutch disk assembly illustrated in FIG. 4.

As best seen in FIGS. 6 and 7, the first-stage damper 94 is formed of a pair of output plates 96, an input plate 95, and a plurality of third springs 8. The pair of output plates 96 is non-rotatably engaged with the boss 81 of the hub 3. The input plate 95 serves as a member on the input side of the first-stage damper 94. The third springs 8 elastically couple the input plate 95 to the output plates 96 in the rotating direction. As seen in FIG. 6, the input plate 95 is connected to at least one spring seat 66, which in turn is connected to the sub-plates 13. Thus, the first-stage damper elastically couples the hub 3 to the sub-plates 13.

The pair of output plates 96 are each formed of annular disk-like member, and the output plates 96 are axially spaced from each other. As shown in FIG. 7, the output plates 96 are fixed together by a plurality of pins 105. Each output plate 96 is provided at its inner periphery with engagement teeth 104. The engagement teeth 104 are engaged with engagement teeth 106 formed on the outer peripheral surface of the boss 8 1. Thereby, the output plates 96 rotate together with the hub 3, as seen in FIG. 6. A snap ring 111 is in contact with the surface on the axially outer side (i.e., preferably the transmission side in this embodiment) of the radially inner portion of the output plate 96 which is located on the axially outer side. The snap ring 111 is an annular member having one cut or gap as seen in FIGS. 2 and 8. The snap ring 111 is fitted into an annular groove formed in the outer surface of the boss 81.

The input plate 95 is an annular disk-like plate member disposed between the pair of output plates 96. The input plate 95 is formed of an annular portion 97 and engagement claws 98. The annular portion 97 is primarily disposed axially between the output plates 96. Referring to FIG. 7, the annular portion 97 is provided with a plurality of openings 100 through which pins 105 extend. As seen in FIGS. 5 and 6, each engagement claw 98 is a projection extending radially outward from the input plate 95.

Preferably, two pairs of the engagement claws 98 are provided for receiving first springs 9 therebetween. As seen in FIGS. 6 and 8, each pair of the engagement claws 98 are in contact with the circumferentially outer sides of one pair of spring seats 66 arranged on the circumferentially opposite sides of each first spring 9. In other words, the torque supplied from the hub flange 12 is transmitted through the first springs 9 to the first-stage damper 94 via engagement claws 98 of input plate 95. More specifically, as shown in FIG. 8, each engagement claw 98 has a contact surface 99 complementary in shape with the curved surface 71 of the semi-columnar portion 67 of each spring seat 66. Each contact surface 99 is in contact with the curved surface 71. In this manner, the engagement claws 98 are capable of axial movement with respect to spring seats 66. Further, the engagement claws 98 can be easily disengaged from spring seats 66 due to this arrangement. Each spring seat 66 can rotate around an axial center line of semi-columnar portion 67 with respect to each engagement claw 98 owing to the engagement between the contact surface 99 and the curved surface 71.

As best seen in FIG. 6, the annular portion 97 of input plate 95 is provided with a plurality of recesses 1 12. Each output plate 96 is provided with a plurality of cut and bent windows 113 corresponding to the recesses 112, respectively. The third springs 8 are disposed within the recesses 112 and the cut and bent windows 113. In other words, third springs 8, recesses 112 and cut and bent window 113 are circumferentially aligned with each other. The cut and bent windows 113 restrict the axial and radial movement of the third springs 8.

Figure 4:
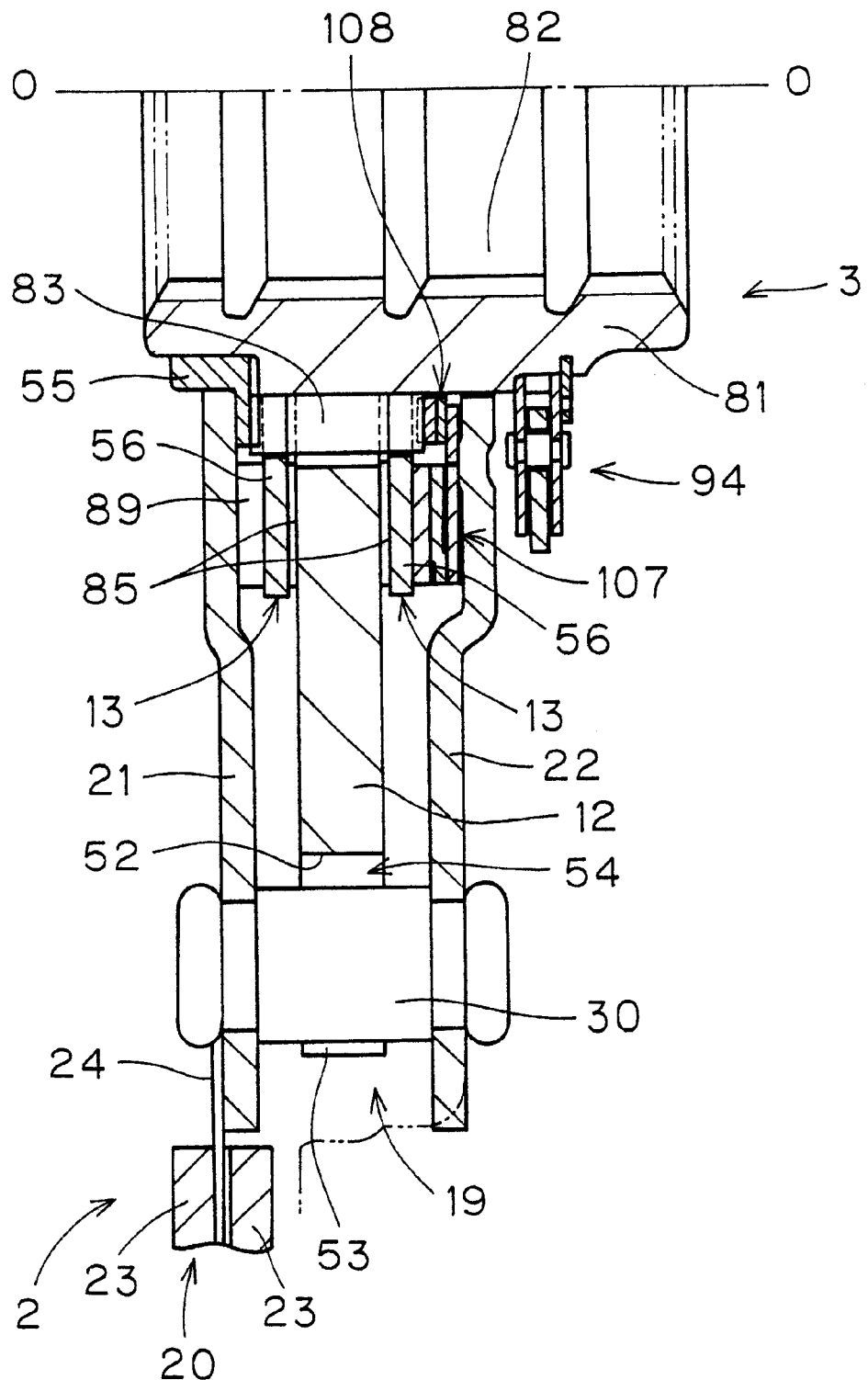
FIG. 4 is an enlarged fragmentary cross sectional view of a lower half of the clutch disk assembly illustrated in FIG. 1.

As best seen in FIG. 4, an annular bushing 55 is disposed on the inner periphery of the clutch plate 21. The bushing 55 has a radial flange and is in rotatable contact with the outer peripheral surface of the portion of the boss 81, on the engine side thereof. Thereby, the clutch and retaining plates 21 and 22 are radially positioned with respect to the hub 3. As seen in FIG. 6, the bushing 55 is in contact with the end surface 81b of the boss 81 which is directed axially toward the engine, and the radial flange of bushing 55 contacts the transmission side of the inner periphery of clutch plate 21.

Figure 36:
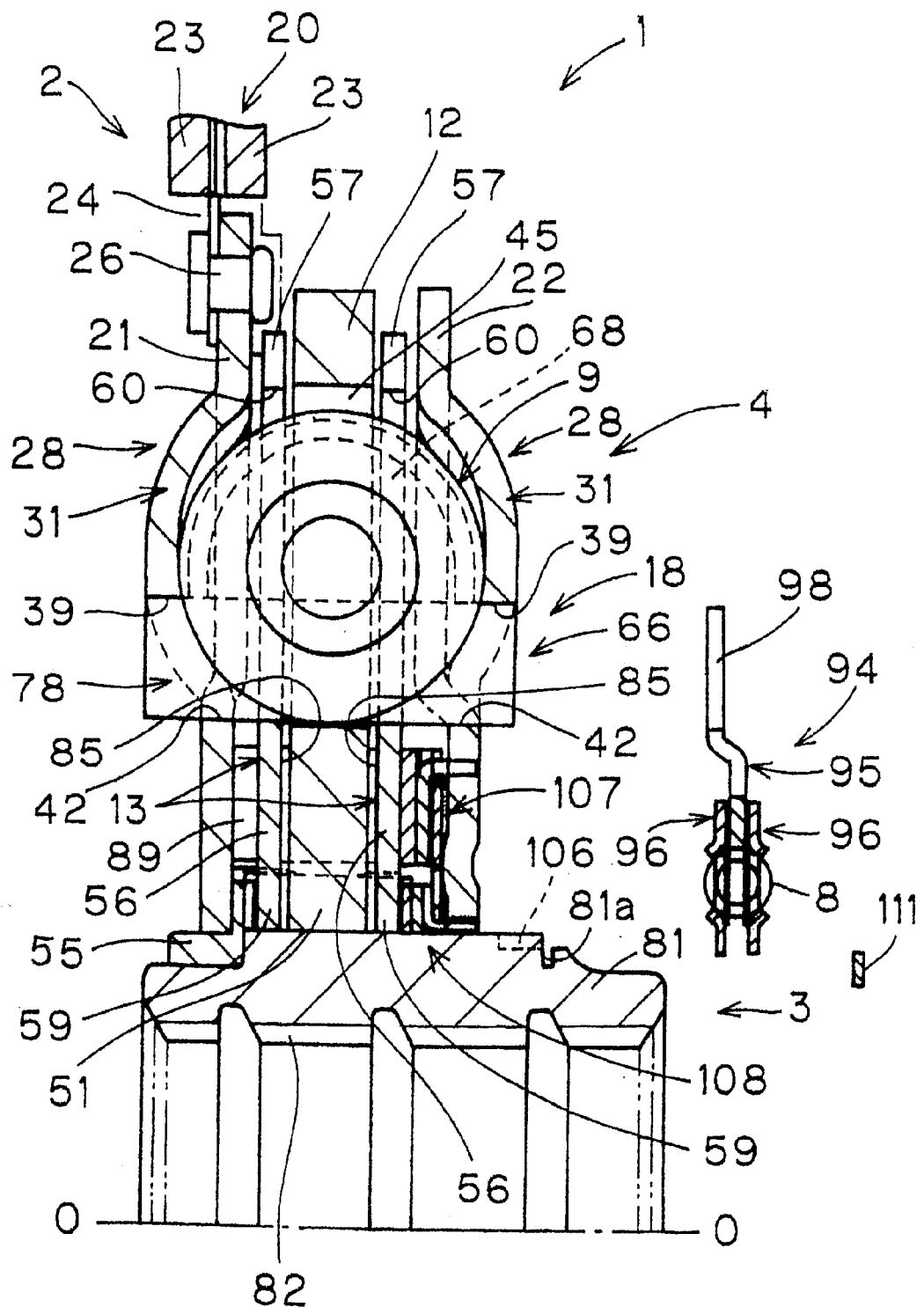
FIG. 36 is a fragmentary cross-sectional view of a clutch disk assembly body and a first-stage damper removed from the main body.

Referring again to FIG. 6, the first-stage damper 94 described above is preferably designed as one sub-assembly, which can be removed from the other portions of the clutch disk assembly 1 by removing the snap ring 111 from the boss 81. The removed first-stage damper 94 is shown in FIG. 36. Even if the first-stage damper 94 is removed, the remaining portions can still adequately function as the clutch disk assembly. This means that various clutch disk assemblies having different torsion characteristics can be achieved by employing/removing the first-stage damper and/or by changing the type or characteristics of the first-stage damper. Such a function can be achieved by using the same members, other structures or by modifying members of the illustrated structure.

As best seen in FIG. 5, the clutch disk assembly 1 further includes a first friction mechanism 107 and a second friction mechanism 108. The first friction mechanism 107 is a mechanism for generating friction when the plates 21 and 22 rotate relative to the sub-plates 13. As seen in FIG. 6, the first friction mechanism 107 is formed of a friction member 86, a plate 87, a first conical spring 88 and a friction member 84. The friction member 86, the plate 87 and the first conical spring 88 are preferably arranged axially adjacent each other toward the transmission, respectively. Moreover, friction member 86, plate 87 and conical spring 88 are preferably radially aligned at their inner peripheries and are axially disposed between the annular portion 56 of the sub-plate 13 on the transmission side and the inner peripheral portion of the retaining plate 22. The friction member 86 is in contact with the annular portion 56 of the sub-plate 13. The plate 87 is in axial contact with the transmission side of the friction member 86. The plate 87 is provided with a plurality of engagement claws, which extend axially toward the transmission.

The engagement claws of plate 87 are non-rotatably and axially movably engaged with apertures formed in the retaining plate 22. The first conical spring 88 is disposed between the plate 87 and the retaining plate 22. The first conical spring 88 is axially compressed between the plates 87 and 22. Retaining plate 22 includes a protruding portion that extends toward the engine to engage an inner periphery of conical spring 88. Therefore, the first conical spring 88 applies a biasing force to the plate 87 and the retaining plate 22 to move or push them axially away from each other. More specifically, the first conical spring 88 has an outer periphery in contact with the plate 87, and also has an inner periphery in contact with the retaining plate 22 to bias friction member 86 toward sub-plate 13. The first conical spring 88 is provided at its outer periphery with claws engaged with the engagement claws of plate 87. Thereby, the first conical spring 88 rotates together with the plate 87 and the retaining plate 22. The friction member 84 is disposed between the annular portion 56 of the sub-plate 13 on the engine side and the inner peripheral portion of the clutch plate 21, and is preferably radially aligned with friction member 86.

The second friction mechanism 108 is a mechanism for generating friction whenever the clutch and retaining plates 21 and 22 rotate relative to the hub 3 and is arranged radially inwardly of first friction mechanism 107. The second friction mechanism 108 is configured to generate a smaller frictional force than the first friction mechanism 107. The second friction mechanism 108 is formed of a washer 90, a plate 91 and a second conical spring 92. The washer 90 is in contact with the surfaces of the outer teeth 83 on the transmission side. The plate 91 is in contact with the surface of the washer 90 on the transmission side. The plate 91 is provided at its inner periphery with a plurality of claws that project axially toward the transmission. These claws of plate 91 are engaged with recesses formed in the inner periphery of the retaining plate 22. Therefore, the plate 91 is non-rotatable and axially movable with respect to the retaining plate 22. The second conical spring 92 is axially compressed between the plate 91 and the retaining plate 22. The outer periphery of second conical spring 92 contacts the protruding portion of retaining plate 22 and the inner periphery of second conical spring 92 contacts plate 91. Therefore, the second conical spring 92 axially biases the plate 91 and the retaining plate 22 to move or push them away from each other. The second conical spring 92 is provided at its inner periphery with claws engaged with the engagement claws of plate 91. Thereby, the second conical spring 92 rotates together with the plate 91 and the retaining plate 22.

Figure 18:
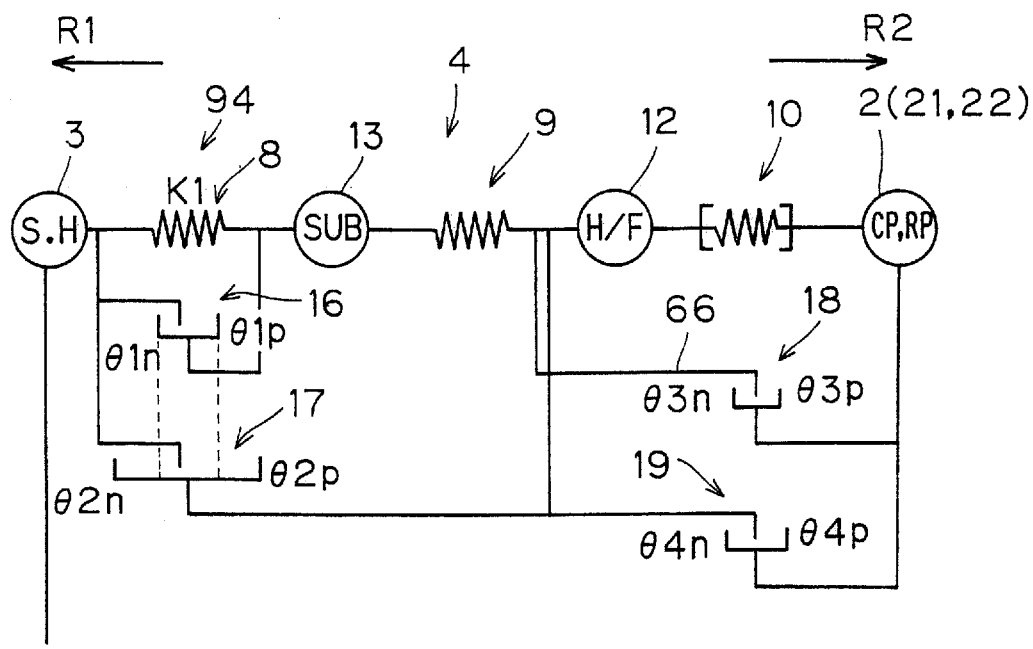
FIG. 18 is a mechanical circuit diagrammatical view of a damper mechanism for the clutch disk assembly illustrated in FIGS. 1–10.

FIG. 18 is a mechanical circuit diagram of the damper mechanism 4 of the clutch disk assembly 1. This mechanical circuit diagram schematically illustrates various parts in the damper mechanism 4. This mechanical circuit diagram shows the relationship between the respective parts and the operation in the state where the input rotary member 2 is twisted in the R1 direction with respect to the hub 3. Thus, FIG. 18 is used for showing the operation in the positive range of the torsion characteristics. In other words, in relative terms, FIG. 18 shows the operation in the range where the hub 3 is twisted in the R2 direction from the initial neutral position with respect to the input rotary member 2. Further, the input rotary member 2 is twisted in the R1 direction from the initial neutral position with respect to the hub 3. The third springs 8, the first springs 9 and the second springs 10 are aligned in the order shown in FIG. 18 from the side of the hub 3, and are arranged in series between the hub 3 and the input rotary member 2.

The sub-plates 13 are disposed between the third springs 8 and the first springs 9. The hub flange 12 is disposed between the first springs 9 and the second springs 10. The third stop 16 is disposed between the hub 3 and the sub-plates 13. Thereby, the third springs 8 are compressed only in a limited range, in which the hub 3 and the sub-plates 13 can rotate relative to each other (through operation angles θ3p and θ3n defined by the third stop 16). The first stop 17 is arranged between the hub 3 and the hub flange 12. Thereby, the first springs 9 are compressed only in a range in which the hub 3 and the hub flange 12 can rotate relative to each other (through operation angle ranges (θ2p–θ1p), (θ2n–θ1n) defined by the first stop 17). The second stop 19 is arranged between the hub flange 12 and the input rotary member 2. Thereby, the second springs 10 are compressed only in a range in which the hub flange 12 and the input rotary member 2 can rotate relative to each other (through operation angle ranges (θ4p, θ4n) defined by the second stop 19).

In this damper mechanism 4, the third springs 8 each have an extremely low rigidity when compared to the first and second springs 9 and 10. Therefore, in the initial stage of the torsion operation, only the third springs 8 are compressed, and the first and second springs 9 and 10 are not substantially compressed. Since the second springs 10 are larger in number than the first springs 9, the second springs 10 generate a larger load as a whole. Each second spring 10 in the initial state is compressed between the input rotary member 2 and the hub flange 12. Therefore, the second springs 10 generate an initial load. Accordingly, in the operation of compressing the first springs 9, only the first springs 9 are compressed until the torque generated by the first springs 9 exceeds the initial torque of the second springs 10.

Figure 27:
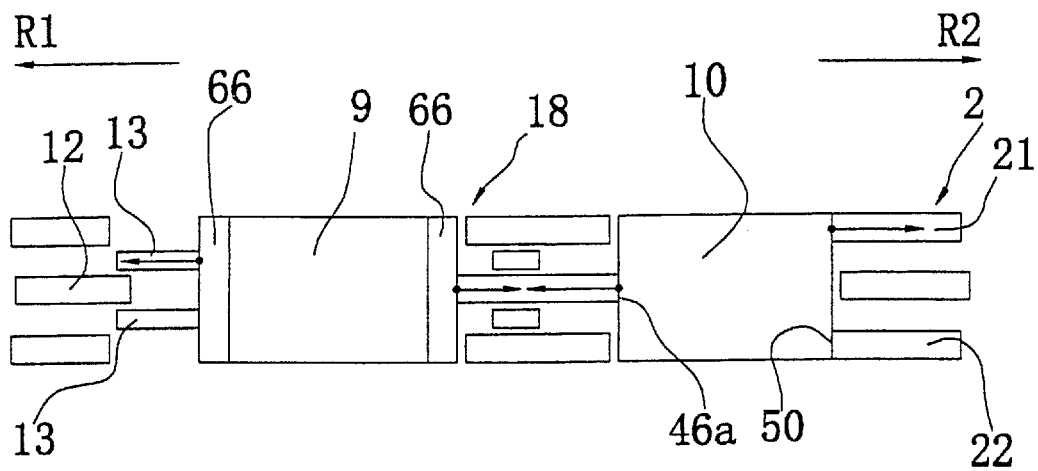
FIG. 27 is a diagrammatical view of the damper mechanism illustrated in FIG. 23 schematically showing the state illustrated in FIG. 21.
Figure 28:
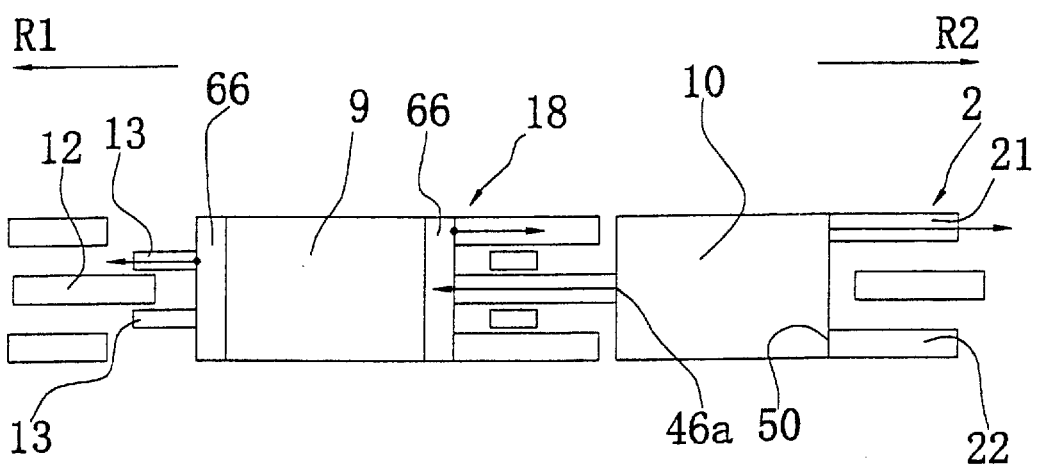
FIG. 28 is a diagrammatical view of the damper mechanism illustrated in FIG. 23 schematically showing the state illustrated in FIG. 22.
Figure 29:
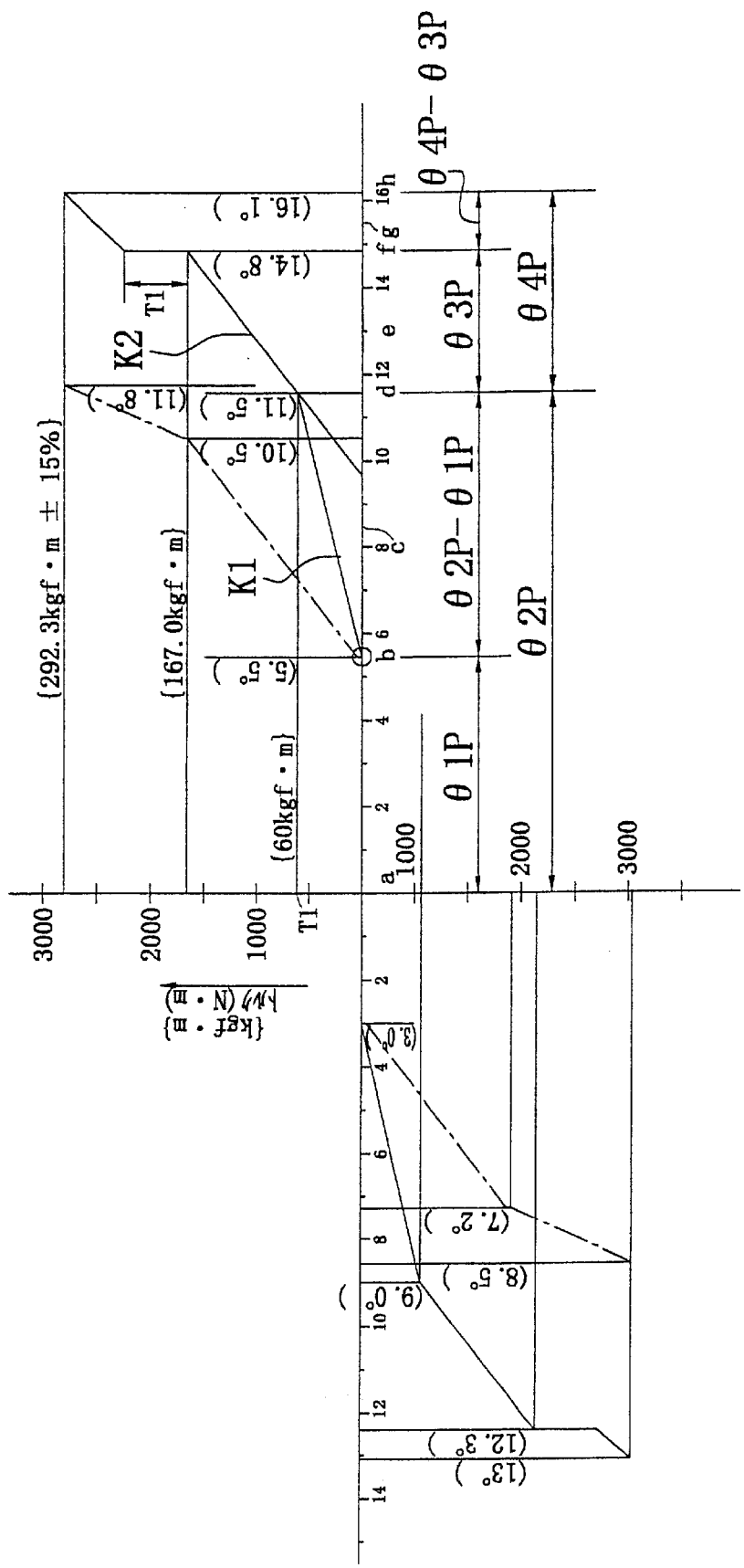
FIG. 29 is a torsion characteristic diagram of the clutch disk assembly of the first embodiment.

Referring to mechanical circuit diagrams of FIGS. 18 to 22, schematic operation diagrams of FIGS. 23 to 28 and a torsion characteristic diagram of FIG. 29, description will now be given on the operations of the damper mechanism 4 of the clutch disk assembly 1. In the following description of the operation with reference to the torsion characteristic diagram of FIG. 29, it is assumed that the input rotary member 2 is twisted in the R1 direction with respect to the hub 3. Thus, the following operation is performed by increasing the torsion angle (a) in the initial neutral state to the maximum torsion angle (h), as shown in FIG. 29. Similar operations are performed in the negative range (i.e. on the left side in FIG. 29), and therefore will not be described in detail herein. Various values in FIG. 29 are mere examples, and are not intended to restrict the present invention.

Solid lines show the characteristics of the present invention, and dotted lines show the characteristics of a conventional structure. In the conventional characteristics, the rigidity is high in the second and third stages, and therefore the torsion angle cannot be sufficiently increased. According to the torsion characteristics of the present invention, however, the rigidity can be relatively low in the second and third stages, and therefore the whole torsion angle can be increased.

(1) Torsion Angle (a)–(b)

Referring to FIGS. 18 and 29, the torque transmission path is formed from the input rotary member 2 through the second springs 10, hub flange 12, first springs 9 and first-stage damper 94 to the hub 3. Thus, the first-stage damper 94 is supplied with the torque from the hub flange 12 through the first springs 9 and the spring seats 66. Only the third springs 8 are compressed in the rotating direction. This is because the first springs 9 each have a significantly larger rigidity than each of the third springs 8 despite the first springs 9 and the third springs 8 being arranged in series. Sliding occurs only in the second friction generating mechanism 108 illustrated in FIG. 6 during this rotation.

Specific operations are as follows. Still referring to FIGS. 18 and 29, the input rotary member 2 in the state shown in FIG. 18 corresponding to the torsion angle (a) is twisted in the R1 direction with respect to the hub 3. Before the torsion angle reaches the value (b), only the first-stage damper 94 functions to provide the low-rigidity characteristics. In this case, a low hysteresis torque occurs in the second friction mechanism 108(shown in FIG. 6). When the torsion angle reaches the value (b), the outer teeth 83 of the third stop 16 come into contact with the inner teeth 59 of sub-plates 13.

Figure 19:
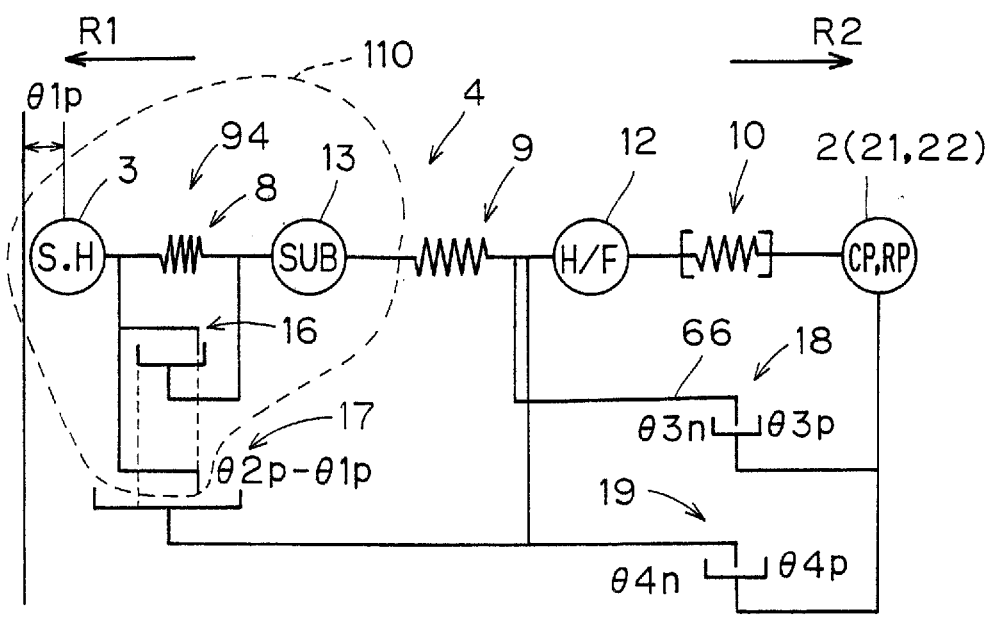
FIG. 19 is a mechanical circuit diagrammatical view of the damper mechanism illustrated in FIG. 18 illustrating the compression of a first-stage damper for the clutch disk assembly illustrated in FIGS. 1–10.
Figure 23:
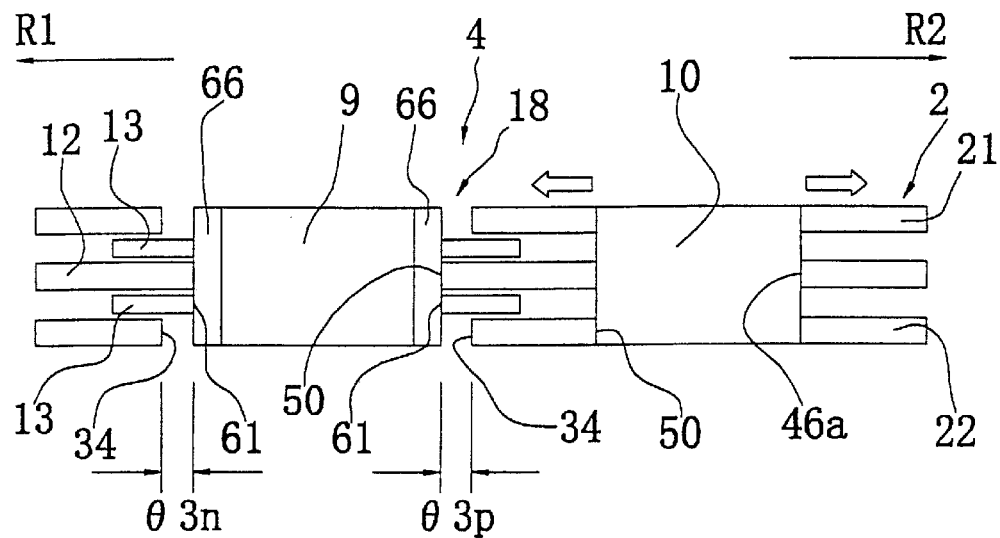
FIG. 23 is a diagrammatical view of the damper mechanism schematically showing the relationships between the respective members in the state illustrated in FIG. 19.

Therefore, after the torsion angle reaches the value (b), the third springs 8 in the first-stage damper 94 are no longer compressed. FIGS. 19 and 23 show the relationships between the respective members in the state of the torsion angle (b). In this state, a circumferential angular space of (θ2p−θ1p) is formed between the outer teeth 83 and the inner teeth 51 on the R2 side in the first stop 17. In the subsequent operations, as shown in FIG. 19, the hub 3, sub-plates 13, third springs 8 and other members operate as an integral member. Accordingly, the hub 3, third springs 8 and sub-plates 13 are considered an integral member, i.e., an output rotary hub 110 in the following description.

(2) Torsion Angle (b)–(d)

Figure 20:
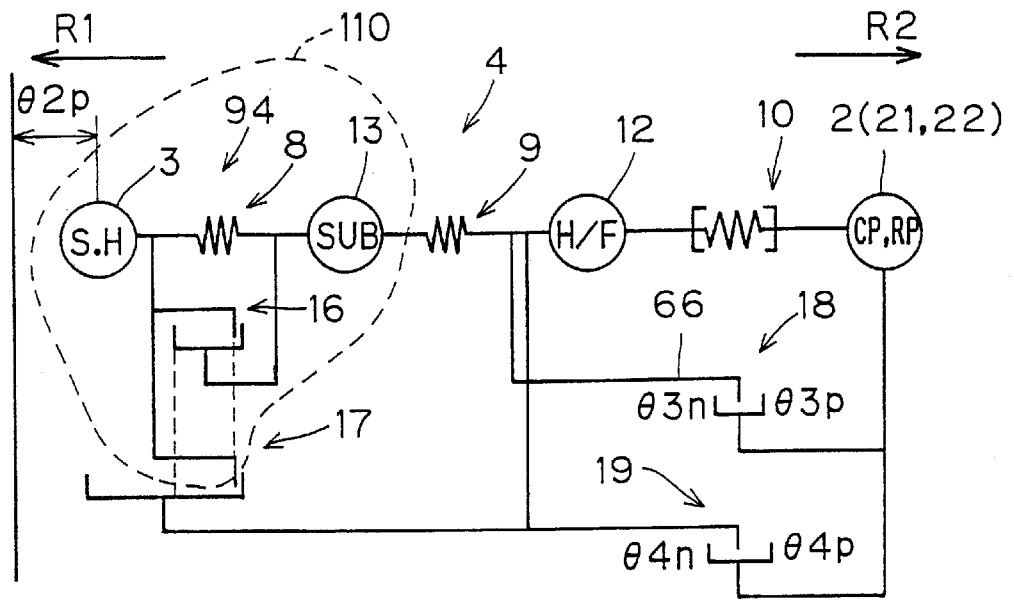
FIG. 20 is a mechanical circuit diagrammatical view of the damper mechanism illustrated in FIG. 18 illustrating the compression of the first-stage damper and a second-stage damper.

Referring now to FIGS. 20 and 29, the torque transmission path is formed from the input rotary member 2 through the second springs 10, hub flange 12, first springs 9 and sub-plate 19 to the hub 3. Only the first springs 9 are compressed. The second springs 10 are not compressed because the second springs 10 are under the initial load. Sliding occurs in the first and second friction mechanisms 107 and 108 (shown in FIG. 6), respectively.

Figure 24:
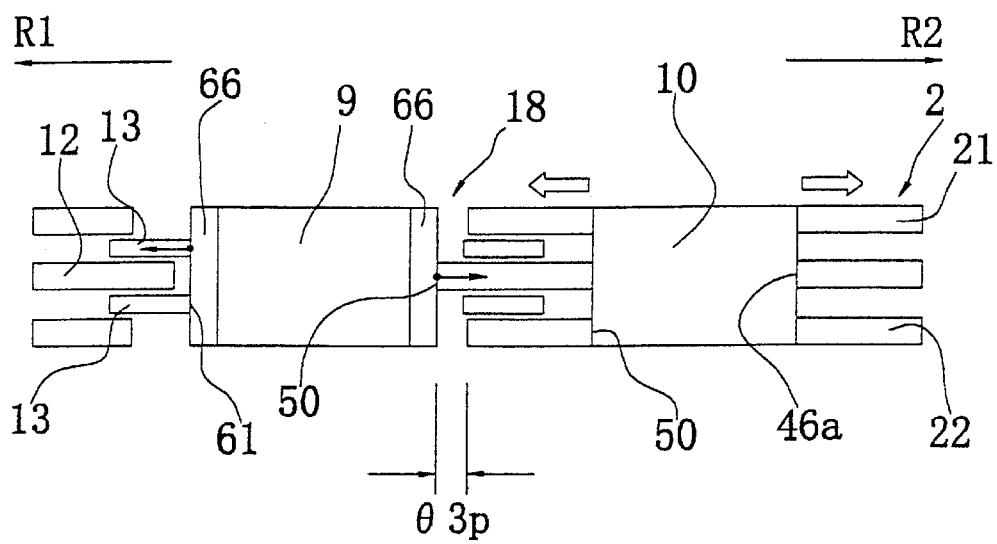
FIG. 24 is a diagrammatical view of the damper mechanism illustrated in FIG. 23 schematically showing a first spring being compressed between a sub-plate and a hub flange.

Description will now be given in more detail to this operation. As seen in FIGS. 20 and 29, when the torsion angle exceeds the value (b), the first springs 9 are compressed between the sub-plates 13 and the hub flange 12. Thereby, the two first springs 9 provide a torsion rigidity of K1 when the torsion angle reaches the value (c). This state is shown in FIG. 24. In this state, as seen in FIG. 8, as the two first springs 9 are compressed in the R1 direction, each engagement claw 98 on the R2 side of the input plate 95 moves away from the spring seat 66 on the R2 side. Each engagement claw 98 on the R1 side follows the spring seat 66 on the R1 side. The radially outer portion of the spring seat 66 on the R1 side is separated from the circumferentially supporting portion 34 of the retaining plate 22 a longer distance than the radially inner portion thereof. Therefore, as seen in FIGS. 8 and 9, the radially outer portion of the spring seat 66 rotates around the engagement portion 78 where the engagement portion 78 contacts with the engagement claw 98 (i.e. the contact surface 99 of claw 98).

Figure 25:
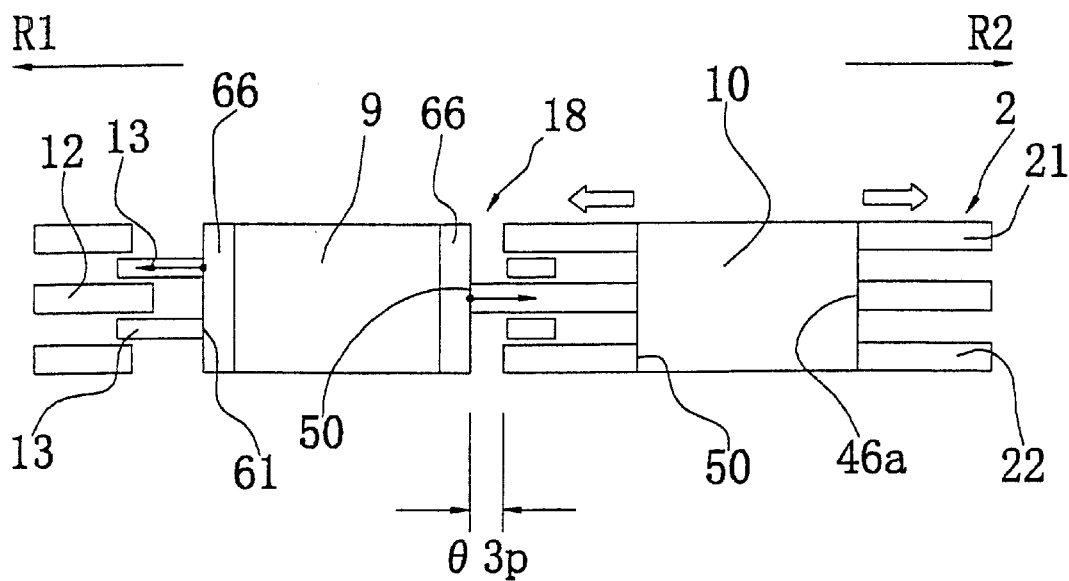
FIG. 25 is a diagrammatical view of the damper mechanism illustrated in FIG. 23 schematically showing the relationships between the respective members in the state illustrated in FIG. 20.
Figure 26:
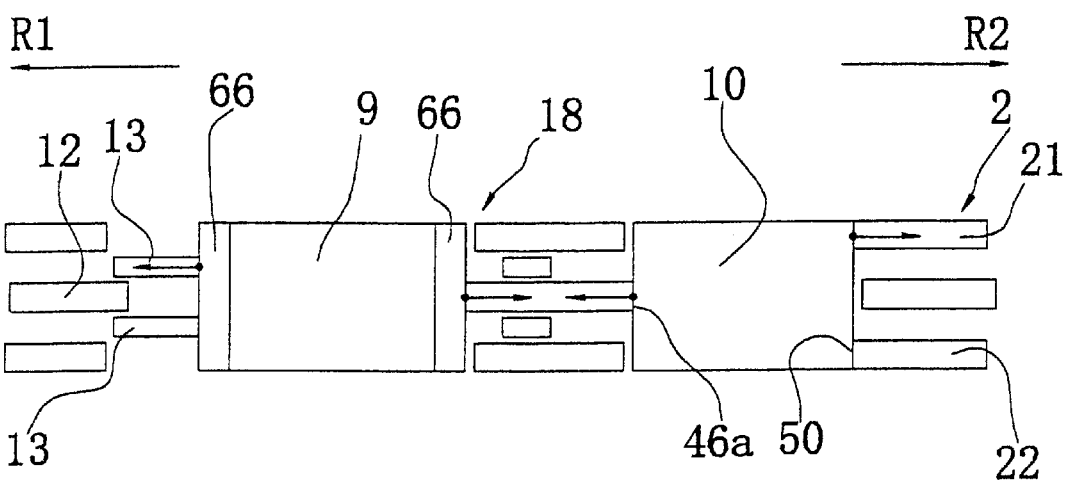
FIG. 26 is a diagrammatical view of the damper mechanism illustrated in FIG. 23 schematically showing the first and a second spring being compressed.

As seen in FIG. 20, the circumferential angular space of θ3p between the compressing portion 18 and the spring seat 66 in this state does not change. When the torsion angle reaches the value (d), the outer teeth 83 come into contact with the inner teeth 51 of hub flange 12 in the first stop 17. This state is shown in FIGS. 20 and 25. Thereafter, the hub flange 12 rotates together with the output rotary hub 110 so that the first springs 9 are not compressed further. Thus, after the torsion angle reaches the value (d), the first springs 9 maintain the state in which they are compressed between the hub flange 12 and the sub-plates 13. Accordingly, the first springs 9 in the compressed state generate the torsion torque of a magnitude of T1 shown in FIG. 29.

Consequently, referring to FIG. 20, the hub flange 12 rotates through an angle of (θ2p−θ1p) in the R1 direction with respect to the sub-plates 13, and thereafter will rotate together with the sub-plates 13. The position of the sub-plates 13 is depicted by the dotted lines in FIG. 10. One of edges 64 on the circumferential ends of the sub-plates 13 shown in FIG. 10 overlaps with one of the second edges 53 of the hub flange 12. This edge 64 comes into contact with the stop pin 30 at the same time the second edge 53 comes into contact with the stop pin 30. The edges 64 on the circumferential ends of the sub-plates 13 are configured not to interfere with the second windows 46 and the second springs 10.

As described above, the first stop 17 stops further compression of the first springs 9 until the load generated thereby exceeds the initial load of the second springs 10. Therefore, compression of the second springs 10 does not start until the torsion angle enters a range between (b) and (d).

(3) Torsion Angle (d)–(f)

Figure 21:
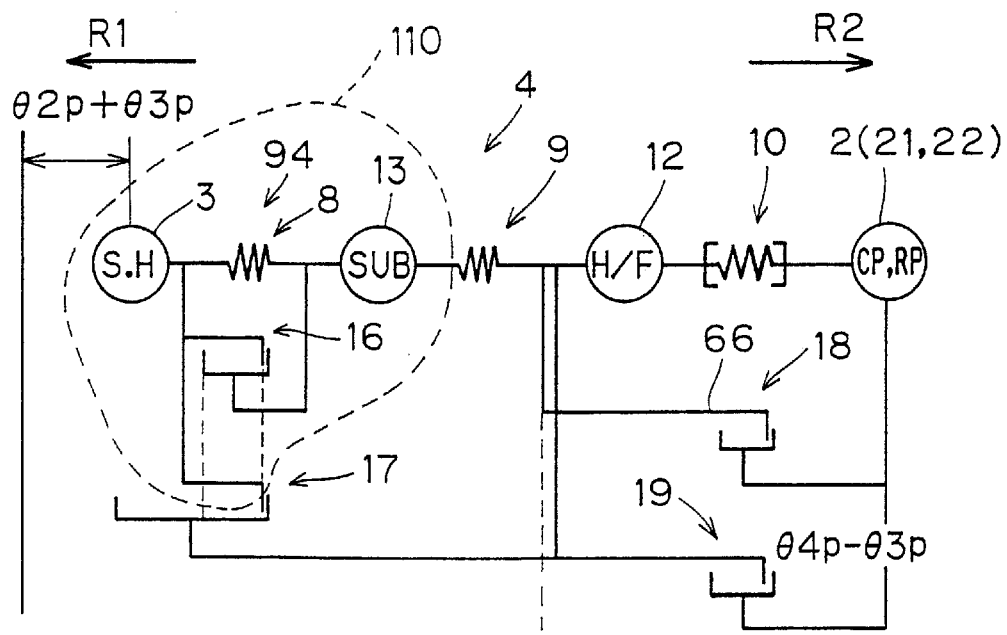
FIG. 21 is a mechanical circuit diagrammatical view of the damper mechanism illustrated in FIG. 18 illustrating the compression of the first-stage damper, the second-stage damper and a third-stage damper.

Referring to FIGS. 21 and 29, the torque transmission path is formed from the input rotary member 2 through the second springs 10 and hub flange 12 to the hub 3. Only the second springs 10 are compressed during this operation. Sliding occurs in the first and second friction mechanisms 107 and 108 respectively, illustrated in FIG. 6.

Specific operations are as follows. Still referring to FIGS. 21 and 29, when the torsion angle exceeds the value (d), the second springs 10 are compressed between the hub flange 3 and the clutch and retaining plates 21 and 22, respectively. More specifically, the second springs 10 are compressed between the circumferentially supporting portions 46a on the R1 sides and the circumferentially supporting portions 50 on the R2 sides of second springs 10, as shown in FIGS. 2, 10 and 11. Therefore, the four second springs 10 provide the torsional rigidity of K2 when the torsion angle is equal to (e). The rigidity of K2 is higher than the rigidity of K1. This state is shown in FIG. 27. As can be seen in FIG. 9, when the torsion angle reaches the value (f), the compressing portions 18 come into contact with the spring seats 66. In other words, the input rotary member 2 engages with the first springs 9 as shown in FIG. 27.

More specifically, as shown in FIG. 8, the spring seat 66 on the R2 side come into contact with the circumferentially supporting portion 34 on the R1 side. Referring again to FIGS. 21 and 29, at the same instant, the torsional torque T1 of the first springs 9 acts on the sub-plates 13 and the input rotary member 2. Therefore, the torque rapidly increases by the magnitude of T1 at the torsion angle of (f). FIGS. 21 and 27 show the state at the torsion angle of (f). In this case, as shown in FIG. 21, a circumferential angular space of (θ4p−θ3p) is formed between the second edges 53 on the R1 sides and the stop pins 30 in the second stop 19.

(4) Torsion Angle (f)–(h)

Figure 22:
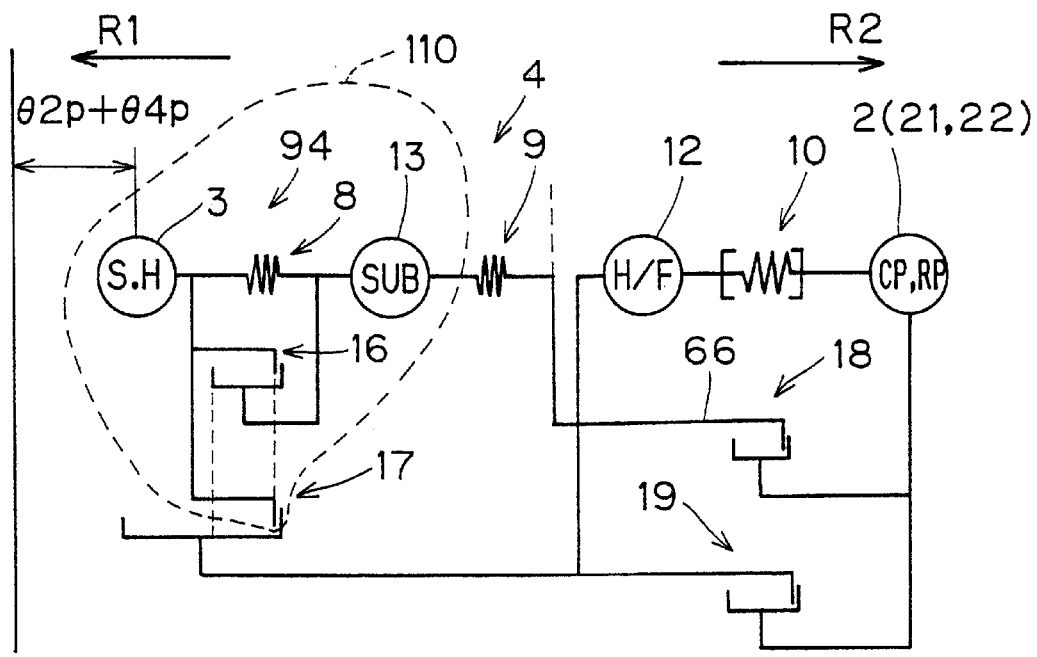
FIG. 22 is a mechanical circuit diagrammatical view of the damper mechanism illustrated in FIG. 18 illustrating the compression of the first-stage damper, the second-stage damper and the third-stage damper being compressed in parallel.

As seen in FIG. 22, the torque transmission path is formed between the input rotary member 2 and the hub 3 through the second springs 10 and the hub flange 12 forming the first path. The second path of the torque transmission path is formed through the first springs 9 and the sub-plates 13. In this case, the torsion torque is shared between the hub flange 12 and the sub-plates 13. Therefore an extremely high strength for the hub flange 12 is not required. More specifically, it is not necessary to form an axially thick portion in an inner peripheral portion of the hub flange 12 to be engaged with the hub 3. Therefore, the hub flange 12 has a relatively flat form as a whole. In this structure, reductions in weight and axially length of the inner peripheral portion of the damper mechanism can be achieved.

The second springs 10 and the first springs 9 are compressed in parallel. Sliding occurs in the first and second friction mechanisms 107 and 108, illustrated in FIG. 6, respectively.

Specific operations are as follows. Referring to FIGS. 22 and 29, when the torsion angle exceeds a value of (f), the first springs 9 are compressed between the sub-plates 13 and the input rotary member 2. The second springs 10 are compressed between the hub flange 12 and the input rotary member 2. Thus, the first and second springs 9 and 10 are compressed in parallel between the input rotary member 2 and the hub 3. Therefore, the rigidity of (K1+K2) is achieved at the torsion angle of(g). This state is shown in FIG. 28. Referring to FIG. 10, when the torsion angle reaches a value of (h), the second edges 53 come into contact with the stop pins 30. Thus, the relative rotation between the hub flange 12 and the input rotary member 2 stops. This state is shown in FIG. 22.

Also, as can be seen in FIG. 10, in this embodiment, the second edges 53 of the hub flange 12 as well as the edges 64 on the circumferential ends of the sub-plates 13 come into contact with the stop pins 30. Thus, the stop torque is shared by the hub flange 12 and the sub-plates 13. This means that an extremely high strength is also not required in the hub flange 12.

The compressing operation of the first springs 9 will now be described in more detail. Referring to FIG. 10, first springs 9 are compressed between the circumferentially supporting portions 61, which include the linear portions 62 and the semicircular portions 63, on the R1 side and the circumferentially supporting portions 34 on the R2 sides seen in FIG. 8. As seen in FIG. 28, the plates 21 and 22 on the move in the R1 direction with respect to the spring seats 66. In this case, as shown by the dotted line in FIG. 9, the engagement portions 78 of the spring seats 66 are displaced in the R2 direction within the second apertures 37.

As seen in FIG. 8, in this operation, the engagement claw 98 on the R2 side of the input plate 95 is displaced further away from the spring seat 66 on the R2 side. Furthermore, the engagement claw 98 on the R1 side is displaced in the R2 direction and therefore follows the spring seat 66 on the R1 side. The radially outer portion of the spring seat 66 on the R1 side is displaced a longer distance than the radially inner portion thereof. Therefore, it rotates around the engagement portion 78 where the engagement portion 78 engages with the engagement claw 98.

The advantages of the second stop 19 will now be discussed in more detail. Referring to FIG. 2, in this embodiment, the second springs 10 operate in a region where the first springs 9 operate. Therefore, the low rigidity region exhibiting the low rigidity of K1 can be sufficiently large although the spaces (circumferential angle of θ4p or θ4n) between the stop pins 39 and the second edges 53 of the recesses 54 in the second stop 19 are small. Therefore, the circumferential angular size of the recesses 54 in the hub flange 12 can be kept relatively small, and the size of windows 45 and 46 can be angularly increased.

The function of the spring seats 66 will now be discussed in more detail. First, referring to FIG. 10, the spring seats 66 are members for supporting the circumferentially opposite ends of the first springs 9. Secondly, referring to FIGS. 2 and 8, the spring seats 66 maintain predetermined spaces from the circumferentially supporting portions 34 of the clutch and retaining plates 21 and 22. One of the spring seats 66 is supported by the circumferentially supporting portions 34 of the clutch and retaining plates 21 and 22 when the torsion torque is in a large range exceeding the value of (f).

Thirdly, referring to FIGS. 2 and 10, each of the spring seats 66 functions as a member for supplying the torque from the hub flange 12 and the sub-plates 13 to the first-stage damper 94. Referring now to FIGS. 8 and 9, in particular, each spring seat 66 has the engagement portion 78 engaged with the first-stage damper 94 in the position axially outside the retaining plate 22 (i.e. on the transmission side of retaining plate 22). Therefore, the first-stage damper 94 can be disposed axially outside the retaining plate 22. Accordingly, the structure radially inside the retaining plate 22 can be relatively simple. The engagement between the spring seats 66 and the first-stage damper 94 has a simple structure, assembly of which can be completed by merely fitting the claws 98 of the input plate 95 with the engagement portions 78 axially from one side.

The input of the torque to the first-stage damper 94 is performed via the first springs 9 and the spring seats 66. However, disadvantageous compression of the first springs 9 during the first stage operation does not occur because the first springs 9 have a sufficiently higher rigidity than the third springs 8. For preventing interference with the engagement portions 78, the axially covering portions 31 are provided with the second apertures 37. In other words, the second apertures 37 are formed in a predetermined circumferential range for allowing circumferential movement of the engagement portions 78.

The effects of circumferential compression of the second springs 10 will now be discussed in more detail. Referring to FIGS. 8 and 10, since the second springs 10 in the set state are compressed in the circumferential direction, the second windows 46 and 29 accommodating the second springs 10 can be relatively small in circumferential size (i.e. circumferential angle of windows 46 and 29). This allows for increases in angular sizes and/or the number of the other windows, apertures or the like. Therefore, the wide torsion angle and the low rigidity can be achieved.

Second Embodiment

Figure 30:
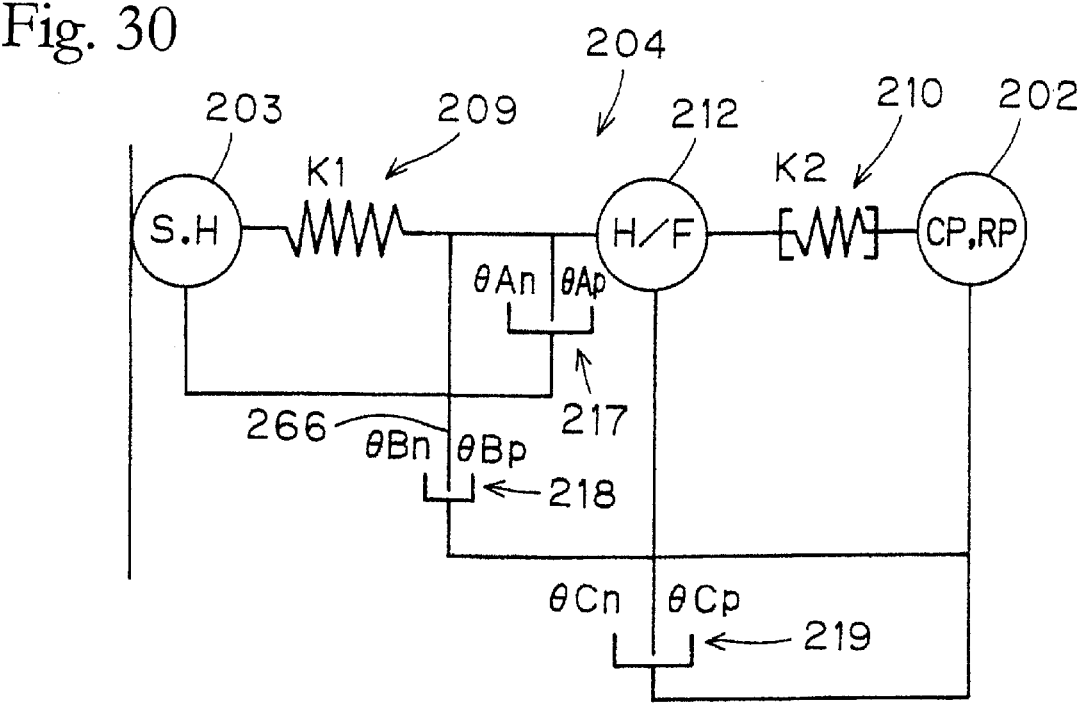
FIG. 30 is a mechanical circuit diagrammatical view of the damper mechanism in accordance with a second embodiment of the present invention
Figure 37:
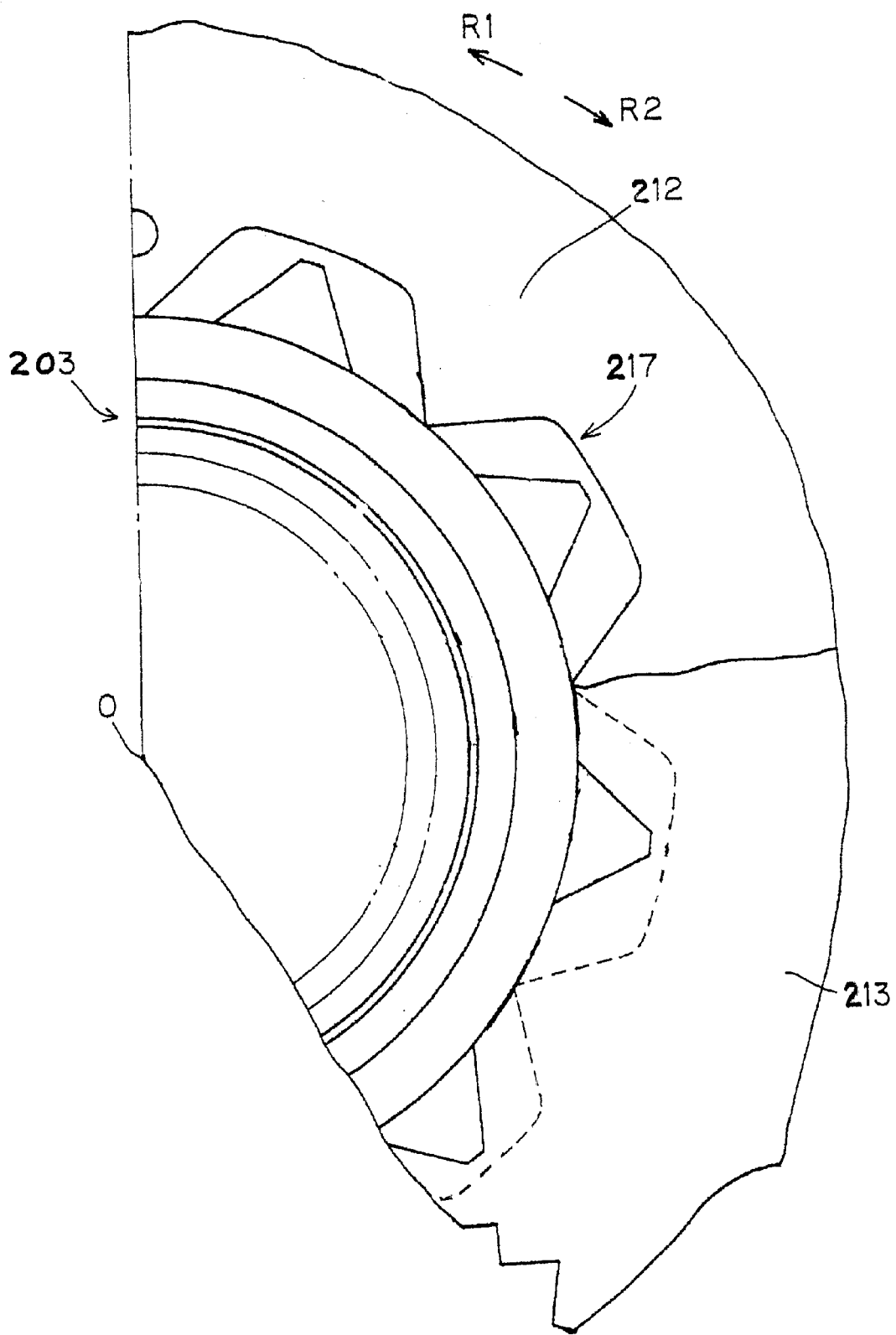
FIG. 37 is an enlarged, side elevational view of a portion of a clutch disk assembly according to the second embodiment of the present invention with certain parts broken away to show a relationship of the hub with respect to the sub-plate and the hub flange.

As seen in a mechanical circuit diagram of FIG. 30, a damper mechanism 204 of a clutch disk assembly 201 in accordance with a second embodiment of the present invention is illustrated. The structure of clutch disk assembly 201 corresponds to the structure of the clutch disk assembly 1 of the first embodiment except that the first-stage damper 94 of the first embodiment is not employed. This structure can be achieved by modifying the structure (i.e. sub-plates 13) of the first embodiment such that the sub-plates 213 of this second embodiment are circumferentially engaged with the hub without a space, and thereby can function as a part of the hub as seen in FIG. 37. Accordingly, clutch disk assembly 201 is substantially identical to clutch disk assembly 1. Therefore, clutch disk assembly 201 and various components thereof will not be discussed or illustrated in detail herein.

In the damper mechanism 204 of the second embodiment, first springs 209 and second springs 210 are disposed in series between input and output rotary members 202 and 203, respectively. A hub flange 212 is disposed between the first and second springs 209 and 210. A first stop 217 is disposed between the output rotary hub 203 and the hub flange 212. A second stop 219 is disposed between the hub flange 212 and the input rotary member 202. The input rotary member 202 is provided with compressing portions 218.

Figure 31:
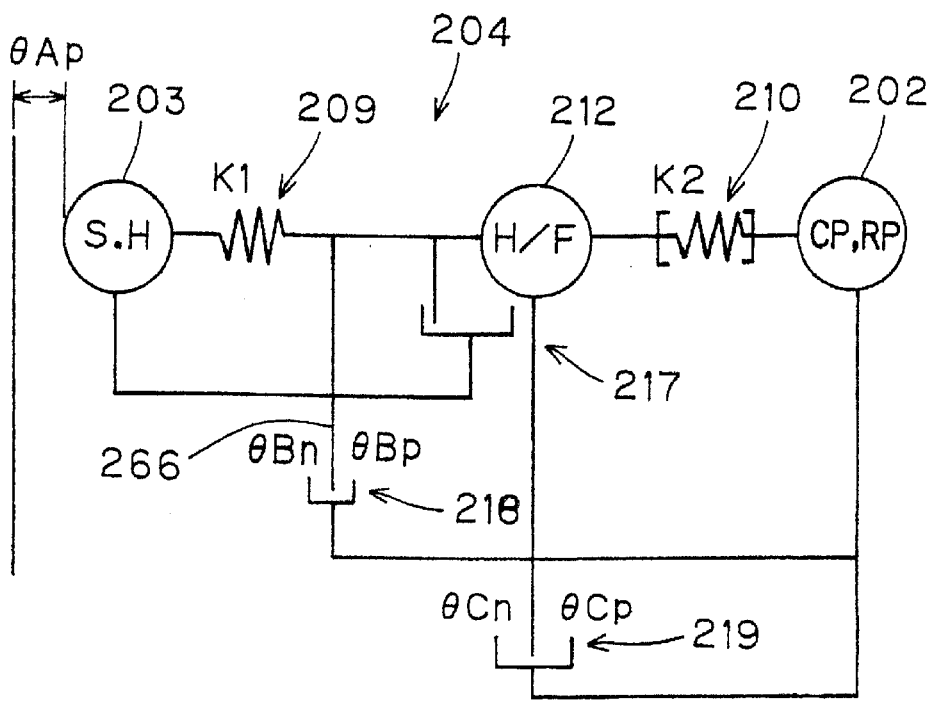
FIG. 31 is a mechanical circuit diagrammatical view of the damper mechanism according to the second embodiment of the present invention illustrating the compression of a first-stage damper.
Figure 33:
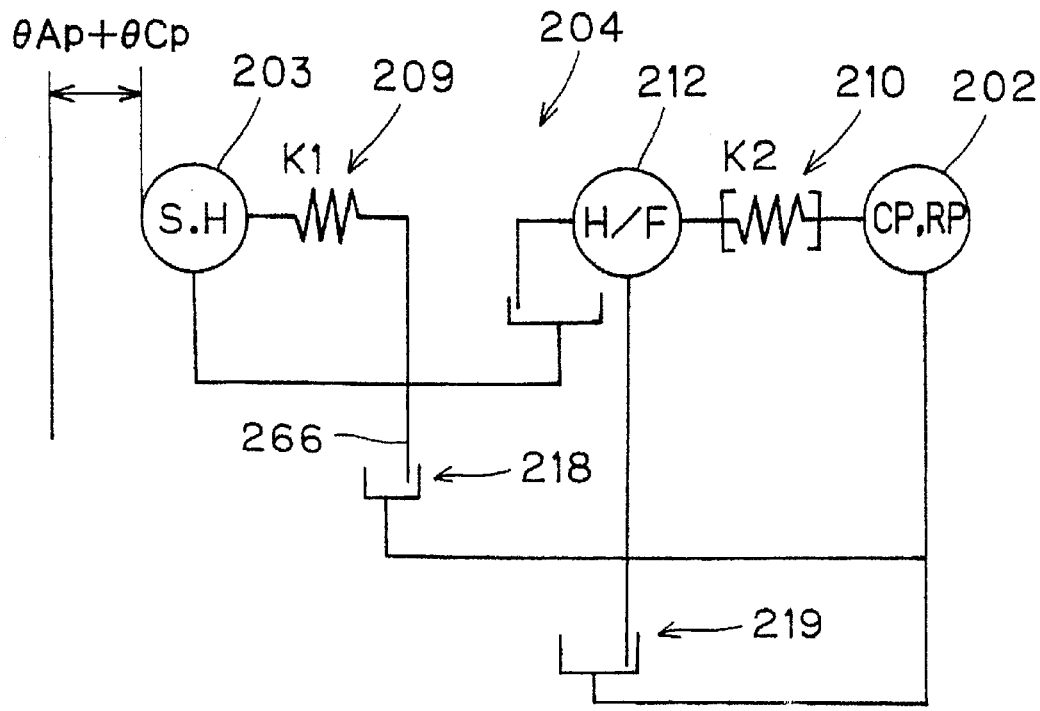
FIG. 33 is a mechanical circuit diagrammatical view of the damper mechanism according to the second embodiment of the present invention illustrating the compression of the first-stage damper and second stage damper operating in parallel.
Figure 34:
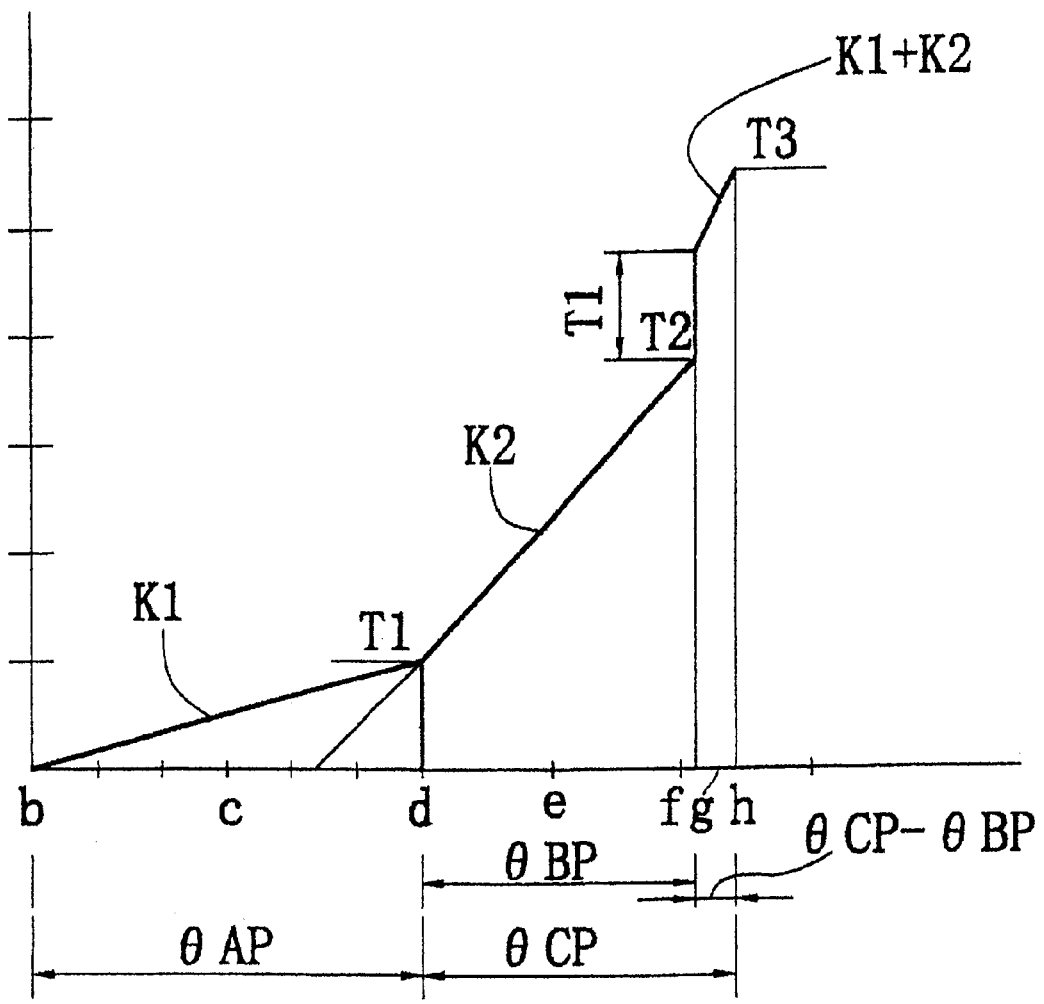
FIG. 34 is a torsion characteristic diagram of the damper mechanism according to the second embodiment of the present invention.

Referring to mechanical circuit diagrams of FIGS. 30–33 and the torsion characteristic diagram of FIG. 34, operations of this damper mechanism 204 will now be described. FIG. 34 shows the positive region characteristics of the torsion characteristics which are achieved by twisting the input rotary member 202 in the R 1 direction with respect to the output rotary hub 203. When the torsion angle is small, only the first springs 209 are compressed so that the rigidity of K1 is obtained. In this operation, the second springs 210 are not compressed because the second springs 210 are already compressed in the initial state (i.e. second springs 210 are initially loaded). When the torsion angle reaches the value of (d), contact occurs in the first stop 217. This state is shown in FIG. 31. Afterwards, the output rotary hub 203 rotates together with the hub flange 212. Thus, the first springs 209 are held between the output rotary hub 203 and the hub flange 212, and rotate together therewith while applying the load to the output rotary hub 203 and the hub flange 212. In this operation, the first springs 209 generate a torsion torque of T1.

Figure 32:
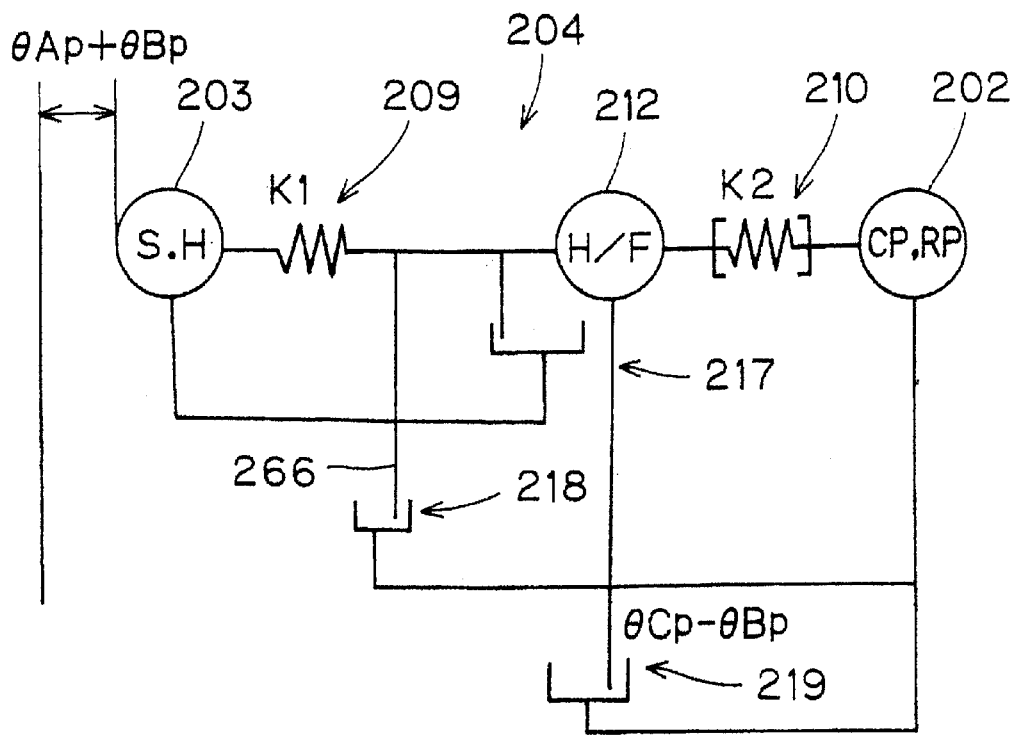
FIG. 32 is a mechanical circuit diagrammatical view of the damper mechanism according to the second embodiment of the present invention illustrating the compression of the first-stage damper and a second-stage damper.

Referring now to FIGS. 32 and 34, when the torsion angle exceeds the value of (d), the second springs 210 are further compressed between the hub flange 212 and the input rotary member 202 to exhibit the rigidity of K2. When the torsion angle reaches the value of (f), the compressing portion 218 on the R2 side of the input rotary member 202 comes into contact with a spring seat 266 on the R2 side. Thereafter, the first spring 209 is compressed between the output rotary hub 203 and the input rotary member 202, and the second spring 210 is compressed between the hub flange 212 and the input rotary member 202. Thus, the first and second springs 209 and 210 are compressed in parallel between the output rotary hub 203 and the input rotary member 202 so that the rigidity of (K1+K2) is obtained. At the torsion angle of (f), the torsion torque rapidly increases by a value corresponding to the torsion torque T1 generated by the first spring 209 in the compressed state.

When the torsion angle reaches the value of (h), contact occurs in the second stop 219, and the relative rotation between the output rotary hub 203 and the input rotary member 202 stops. This state is shown in FIG. 33.

According to the characteristics described above, the second springs 210 do not operate in the small torsion angle range although the first and second springs 209 and 210 are arranged in series. This is because the second springs 210 are initially loaded. Therefore, the operation angle of the second stop 219 can be small. More specifically, an angle between the stop pin and the edge of the recess in the hub flange can be small. This means that a wide space can be maintained for the springs in the hub flange 212, and the number and angular sizes of the windows can be increased.

Alternatively, the second springs may not be initially loaded. The characteristics in the case where the second springs are not initially loaded will now be discussed in more detail. Specifically, referring to the torsion characteristic diagram of FIG. 35, description will now be given on characteristics of a structure, in which the second springs are not initially loaded, in contrast to the preferred embodiments of the present invention. This structure is similar to the structures of the preferred embodiments of the present invention except for the above point so that the characteristics in FIG. 35 can be similar to those of the preferred embodiments. In the case where the second springs are not initially loaded, the first and second springs are compressed in series even at the torsion angle of 0°. Therefore, the rigidity K1 of the second springs are determined to be larger than the rigidity K1 of the first springs 209 shown in FIG. 34. In the region of a small torsion angle, a rigidity of ((1/K1)+(1/K2)) is obtained. After the torsion angle increases to a value causing contact in the first stop, the rigidity of K2 and the rigidity of (K1+K2) are obtained similarly to the characteristics shown in FIG. 34.

Figure 35:
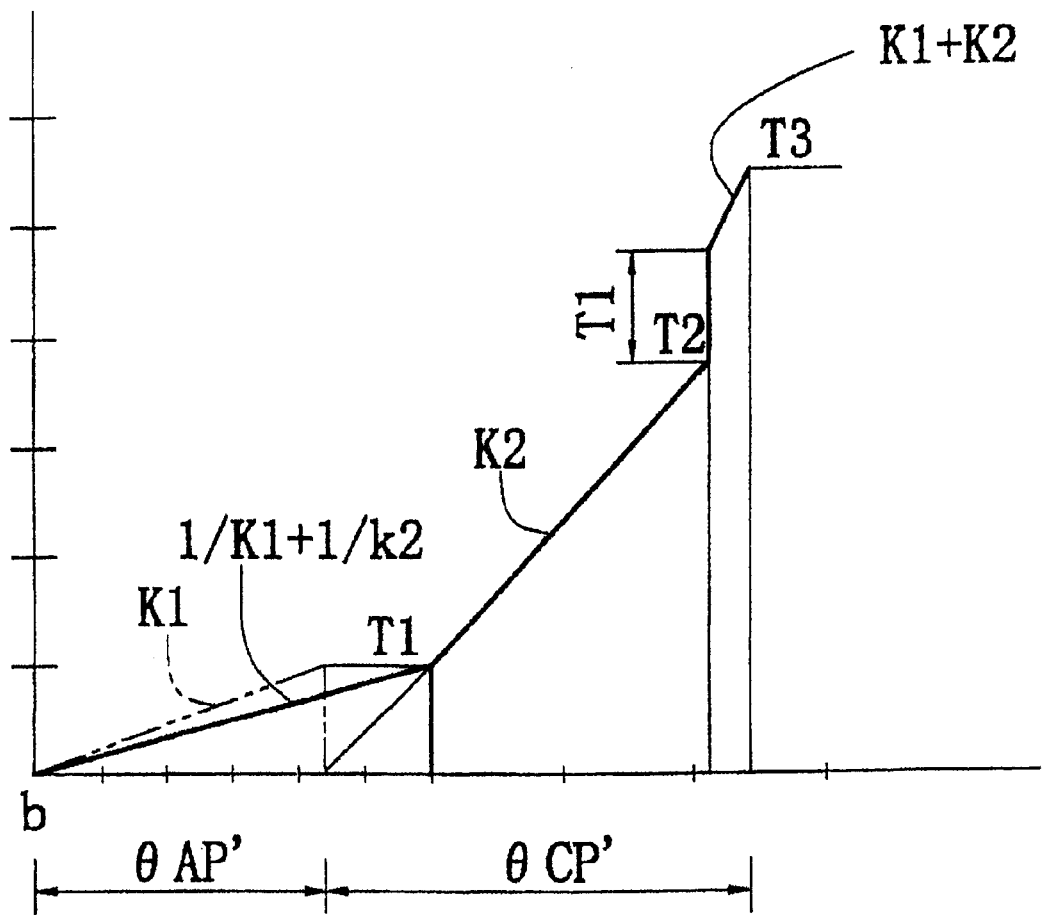
FIG. 35 is a torsion characteristic diagram of a structure, which is similar to that of the invention but is configured to obtain similar characteristics without employing an initial load.

For setting the operation angle of the first stop in FIG. 35 to be equal to that in FIG. 34, it is necessary that the operation angle of the first stop is small. Furthermore, the operation angle of the second stop is large, as compared with the characteristics shown in FIG. 34. More specifically, as shown in FIGS. 34 and 35, θAp' is smaller than θAp, and θCp' is larger than θCp. If θAp' and θCp' in FIG. 35 were equal to θAp and θCp, respectively, the torsion angle at which the contact actually occurs in the first stop would be large. Thus, the region of the rigidity of K1 would become wide, and the region of the rigidity of K2 would become narrow.

Compared with the example shown in FIG. 35, the structure of the present invention shown in FIG. 34 can increase the operation angle of the second stop, but the operation angle of the first stop is small. However, the first stop is formed of the teeth on the hub and the inner periphery of the hub flange. Therefore, adverse effects on accommodation of the springs and others are unlikely to occur, and machining or the like can be easy.

The damper mechanism and the damper disk assembly according to the present invention can be applied to structures other than the clutch disk assembly described above. For example, the invention can be applied, for example, to a damper for elastically coupling two flywheels in the rotating direction, or to a lockup damper of a torque converter.

In the damper mechanism and the damper disk assembly according to the present invention, the intended torsion characteristics can be achieved without operating the first and second elastic members in series. Therefore, the circumferential size of the second relative rotation stop portion can be small.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the preferred embodiments according to the present invention are provided for illustration only, and not for the purpose of limiting the invention as defined by the appended claims and their equivalents.

What is claimed is:

1. A damper mechanism for absorbing and damping torsional vibrations in a rotating direction comprising:

a first rotary member;

a second rotary member arranged to be rotatable with respect to said first rotary member;

an intermediate rotary member arranged between said first and second rotary members;

a first elastic member arranged between said first rotary member and said intermediate rotary member, said first elastic member being compressed when relative rotation occurs between said first rotary member and said intermediate rotary member;

a second elastic member arranged between said intermediate rotary member and said second rotary member, said second elastic member being compressed when relative rotation occurs between said intermediate rotary member and said second rotary member, said second elastic member being initially compressed in the rotating direction between said intermediate rotary member and said second rotary member due to an initial load applied thereto prior to relative rotation between said intermediate rotary member and said second rotary member;

a first relative rotation stop portion arranged to stop relative rotation between said first rotary member and said intermediate rotary member when a torsion angle of said first rotary member relative to said second rotary member reaches a first torsion angle; and a compressing portion arranged to compress said first elastic member between said first and second rotary members when the torsion angle of said first rotary member relative to said second rotary member reaches a second torsion angle larger than said first torsion angle, the initial load being configured such that said second elastic member is not further compressed between said intermediate rotary member and said second rotary member until the torsion angle of said first rotary member relative to said second rotary member reaches said first torsion angle.

2. A damper mechanism for absorbing and damping torsional vibrations in a rotating direction comprising:

a first rotary member;

a second rotary member arranged to be rotatable with respect to said first rotary member;

an intermediate rotary member arranged between said first and second rotary members;

a first elastic member arranged between said first rotary member and said intermediate rotary member, said first elastic member being compressed when relative rotation occurs between said first rotary member and said intermediate rotary member;

a second elastic member arranged between said intermediate rotary member and said second rotary member, said second elastic member being compressed when relative rotation occurs between said intermediate rotary member and said second rotary member, said second elastic member being initially compressed in the rotating direction between said intermediate rotary member and said second rotary member due to an initial load applied thereto;

a first relative rotation stop portion arranged to stop relative rotation between said first rotary member and said intermediate rotary member when a torsion angle of said first rotary member relative to said second rotary member reaches a first torsion angle;

a compressing portion arranged to compress said first elastic member between said first and second rotary members when the torsion angle of said first rotary member relative to said second rotary member reaches a second torsion angle larger than said first torsion angle; and a second relative rotation stop portion arranged to stop relative rotation between said first and second rotary members when the torsion angle of said first rotary member relative to said second rotary member reaches a third torsion angle larger than said second torsion angle, the initial load being configured such that said second elastic member is not further compressed between said intermediate rotary member and said second rotary member until the torsion angle of said first rotary member relative to said second rotary member reaches said first torsion angle.

3. The damper mechanism according to claim 2, wherein said first relative rotation stop portion is formed by a gap and an abutment arrangement between said first rotary member and said intermediate rotary member, and said second relative rotation stop portion is formed by a gap and an abutment arrangement between said intermediate rotary member and said second rotary member.

4. The damper mechanism according to claim 3, wherein said compressing portion is formed by a portion of said second rotary member, and said compressing portion is arranged to separate from said first elastic member a predetermined distance in the rotating direction, said predetermined distance defines a first space; and a second space is formed in said second relative rotation stop portion between said intermediate rotary member and said second rotary member in the rotating direction, said second space being circumferentially angularly larger than said first space.

5. A damper disk assembly for absorbing and damping torsional vibrations in a rotating direction, comprising:

an output rotary hub;

a pair of input disk members disposed relatively rotatably on an outer periphery of said output rotary hub, said pair of input disk members being fixed together with an axial space therebetween;

an intermediate disk member disposed rotatably on the outer periphery of said output rotary hub and axially between said paired input disk members, said intermediate disk member being provided with first and second windows;

a first elastic member disposed within said first window and arranged between said output rotary hub and said intermediate disk member to compress in accordance with the relative rotation between said output rotary hub and said intermediate disk member;

a second elastic member accommodated in said second window, arranged between said intermediate disk member and said pair of input disk members to compress in accordance with the relative rotation between said intermediate disk member and said pair of input disk members, and initially compressed in the rotating direction between said intermediate disk member and said pair of input disk members due to an initial load applied thereto;

a first relative rotation stop portion arranged to stop the relative rotation between said output rotary hub and said intermediate disk member when the torsion angle of said output rotary hub with respect to said pair of input disk members reaches a first torsion angle; and a compressing portion arranged to compress said first elastic member between said output rotary hub and said pair of input disk members when the torsion angle of said output rotary hub with respect to said pair of input disk members reaches a second torsion angle larger than said first torsion angle, the initial load being configured such that said second elastic member does not become further compressed between said intermediate disk member and said pair of input disk members until the torsion angle reaches said first torsion angle.

6. The damper disk assembly according to claim 5, further comprising:

a second relative rotation stop portion arranged to stop the relative rotation between said output rotary hub and said pair of input disk members when the torsion angle of said output rotary hub with respect to said pair of input disk members reaches a third torsion angle larger than said second torsion angle.

7. The damper disk assembly according to claim 6, wherein said first relative rotation stop portion is formed by a gap and an abutment arrangement between said output rotary hub and said intermediate disk member; and said second relative rotation stop portion is formed by a gap and an abutment arrangement between said intermediate disk member and said pair of input disk members.

8. The damper disk assembly according to claim 7, wherein said second relative rotation stop portion is formed of an axial portion and a recess in said intermediate disk member, said axial portion extending axially to fix said pair of input disk members together, said recess being engaged with said axial portion.

9. The damper disk assembly according to claim 8, wherein
said output rotary hub has a hub and a sub-plate extending radially outward from said hub and having a window that engages the circumferentially opposite ends of said first elastic member.

10. The damper disk assembly according to claim 9, wherein
said output rotary hub further includes a damper arranged to elastically couple said hub and said sub-plate in the rotating direction, a rigidity of said damper being lower than that of said first elastic member.

11. The damper disk assembly according to claim 10, further comprising:
a pair of spring seats disposed on the circumferentially opposite ends of said first elastic member, and supported within said window of said sub-plate and said first window of said intermediate disk-like member,
said compressing portion being formed in one of said pair of input disk members and disposed so as to be apart from each of said spring seats by a first space in the rotating direction.

12. The damper disk assembly according to claim 11, wherein
a second space is formed in said second relative rotation stop portion between said intermediate disk member and said pair of input disk members in the rotating direction, said second space being circumferentially angularly larger than said first space.

13. The damper disk assembly according to claim 12 further comprising:
a plurality of first and second elastic members, wherein
said first and second elastic members are aligned in the rotating direction, and
said second elastic members are larger in number than said first elastic members.

14. The damper disk assembly according to claim 13, wherein
a rigidity of said first elastic member is lower than that of said second elastic.

15. The damper disk assembly according to claim 12, wherein
a rigidity of said first elastic member is lower than that of said second elastic member.

16. The damper disk assembly according to claim 7, wherein
said output rotary hub has a hub and a sub-plate extending radially outward from said hub and having a window that engages the circumferentially opposite ends of said first elastic member.

17. The damper disk assembly according to claim 16, wherein
said output rotary hub further includes a damper arranged to elastically couple said hub and said sub-plate in the rotating direction, a rigidity of said damper being lower than that of said first elastic member.

18. The damper disk assembly according to claim 6, wherein
said output rotary hub has a hub and a sub-plate extending radially outward from said hub and having a window that engages the circumferentially opposite ends of said first elastic member.

19. The damper disk assembly according to claim 18, wherein
said output rotary hub further includes a damper arranged to elastically couple said hub and said sub-plate in the rotating direction, a rigidity of said damper being lower than that of said first elastic member.

20. The damper disk assembly according to claim 5, wherein
said output rotary hub has a hub and a sub-plate extending radially outward from said hub and having a window that engages the circumferentially opposite ends of said first elastic member.

21. The damper disk assembly according to claim 20, wherein
said output rotary hub further includes a damper arranged to elastically couple said hub and said sub-plate in the rotating direction, a rigidity of said damper being lower than that of said first elastic member.

22. The damper disk assembly according to claim 21, further comprising:
a pair of spring seats disposed on the circumferentially opposite ends of said first elastic member, and supported within said window of said sub-plate and said first window of said intermediate disk-like member,
said compressing portion being formed in one of said pair of input disk members and disposed so as to be apart from each of said spring seats by a first space in the rotating direction.

23. The damper disk assembly according to claim 22, wherein
a second space is formed in said second relative rotation stop portion between said intermediate disk member and said pair of input disk members in the rotating direction, said second space being circumferentially angularly larger than said first space.

24. The damper disk assembly according to claim 21 further comprising:
a plurality of first and second elastic members, wherein
said first and second elastic members are aligned in the rotating direction, and
said second elastic members are larger in number than said first elastic members.

25. The damper disk assembly according to claim 21, wherein
a rigidity of said first elastic member is lower than that of said second elastic member.

26. The damper disk assembly according to claim 20, further comprising:
a pair of spring seats disposed on the circumferentially opposite ends of said first elastic member, and supported within said window of said sub-plate and said first window of said intermediate disk-like member,
said compressing portion being formed in one of said pair of input disk members and disposed so as to be apart from each of said spring seats by a first space in the rotating direction.

27. The damper disk assembly according to claim 26, wherein
a second space is formed in said second relative rotation stop portion between said intermediate disk member and said pair of input disk members in the rotating direction, said second space being circumferentially angularly larger than said first space.

28. The damper disk assembly according to claim 5 further comprising:

a plurality of first and second elastic members, wherein said first and second elastic members are aligned in the rotating direction, and said second elastic members are larger in number than said first elastic members.

29. The damper disk assembly according to claim 28, wherein a rigidity of said first elastic member is lower than that of said second elastic member.

30. The damper disk assembly according to claim 5, wherein a rigidity of said first elastic member is lower than that of said second elastic member.

* * * * *